US007013906B2

(12) United States Patent
Pearson

(10) Patent No.: US 7,013,906 B2
(45) Date of Patent: Mar. 21, 2006

(54) SYSTEM FOR MONITORING AND OPERATING VALVE MANIFOLDS AND METHOD THEREFORE

(76) Inventor: Ronald W. Pearson, 1925 Willowcrest Lp., Denton, TX (US) 76205

( * ) Notice: Subject to any disclaimer, the term of this patent is extended or adjusted under 35 U.S.C. 154(b) by 131 days.

(21) Appl. No.: 10/383,093

(22) Filed: Mar. 6, 2003

(65) Prior Publication Data

US 2004/0074540 A1 Apr. 22, 2004

Related U.S. Application Data

(60) Provisional application No. 60/362,165, filed on Mar. 6, 2002.

(51) Int. Cl.
*G05D 7/06* (2006.01)

(52) U.S. Cl. .................... 137/113; 137/487.5; 137/557

(58) Field of Classification Search ................ 137/113, 137/557, 112, 487.5
See application file for complete search history.

(56) References Cited

U.S. PATENT DOCUMENTS

| | | | | | |
|---|---|---|---|---|---|
| 2,402,187 | A | * | 6/1946 | Siver | 137/113 |
| 2,768,640 | A | * | 10/1956 | Zimmer et al. | 137/113 |
| 3,643,677 | A | * | 2/1972 | Begleiter | 137/113 |
| 5,062,443 | A | * | 11/1991 | Maric | 137/113 |
| 5,868,162 | A | * | 2/1999 | Dickerson, Jr. | 137/557 |

* cited by examiner

*Primary Examiner*—Stephen M. Hepperle
(74) *Attorney, Agent, or Firm*—Koestner Bertani, LLP

(57) ABSTRACT

A gas manifold that provides an uninterrupted supply of gas and automatically switches between at least two gas sources. This gas manifold couples to a on-line gas source and a reserve gas source. A pressure transducer at the inlet to the manifold reads the pressure of the gas source. A downstream pressure regulator of each pressure transducer regulates the pressure of gas supplied to a control valve directed by a control circuit. This control circuit monitors the pressure read by the pressure transducers to determine which gas source will be placed on service depending on user preferences, and directs the operation of the control valve to effect those choices.

20 Claims, 21 Drawing Sheets

SYSTEM FOR MONITORING AND OPERATING VALVE MANIFOLDS AND METHOD THEREFORE

CROSS-REFERENCE TO RELATED APPLICATION

This application is related to and claims the benefit of priority from U.S. Provisional Patent Application Ser. No. 60/362,165, filed Mar. 6, 2002, entitled "SYSTEM FOR MONITORING AND OPERATING VALVE MANIFOLDS AND METHOD THEREFORE".

TECHNICAL FIELD

The present invention relates to gas supply manifolds. Specifically, the invention relates to an automatic gas manifold for providing an uninterrupted supply of gas.

BACKGROUND OF THE INVENTION

Gas used in industrial applications is provided in a variety of containers, which have a variety of characteristic pressures. Examples of such containers are high-pressure cylinders, liquid dewars, and bulk tanks. Additionally, different types of gas are stored at different characteristic pressures.

Gas supply manifolds allow one of two or more gas sources to supply gas to a common outlet. In one type of such a manifold, the selection of the gas source is performed by manually operating one or more valves to connect the desired gas source to the outlet. To prevent an interruption of the gas supply, an operator must be present and must switch to another gas source before the source in use is exhausted.

Some conventional gas supply manifolds provide an uninterrupted supply of gas by using a collection of pressure regulators and check valves to ensure that gas from only one source flows to the outlet. This type of manifold is described in U.S. Pat. No. 6,260,568 to Hsu, et al. When the gas source currently in use is depleted, the falling pressure from that source causes the regulators and valves to respond pneumatically to cut off the flow from the depleted source and to allow the gas from another source to begin flowing to the outlet. Such manifolds, however, must be reconfigured or manually adjusted when a new type of container is connected, or when used with a different type of gas.

Other conventional gas supply manifolds that provide an uninterrupted supply of gas use pressure sensors connected to electrically operated valves to change from one gas source to another, when the first source becomes exhausted. The pressure sensor is a pressure-operated electrical switch that closes or opens when the pressure is above or below a set level. Thus, when the source in use becomes depleted and its pressure falls below a set level, the associated pressure sensor closes, causing pre-selected valves to open and close to connect another gas source to the outlet. This type of manifold, too, must be reconfigured or manually adjusted when a new type of container is connected, or when used with a different type of gas.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE INVENTION

Figure 1:
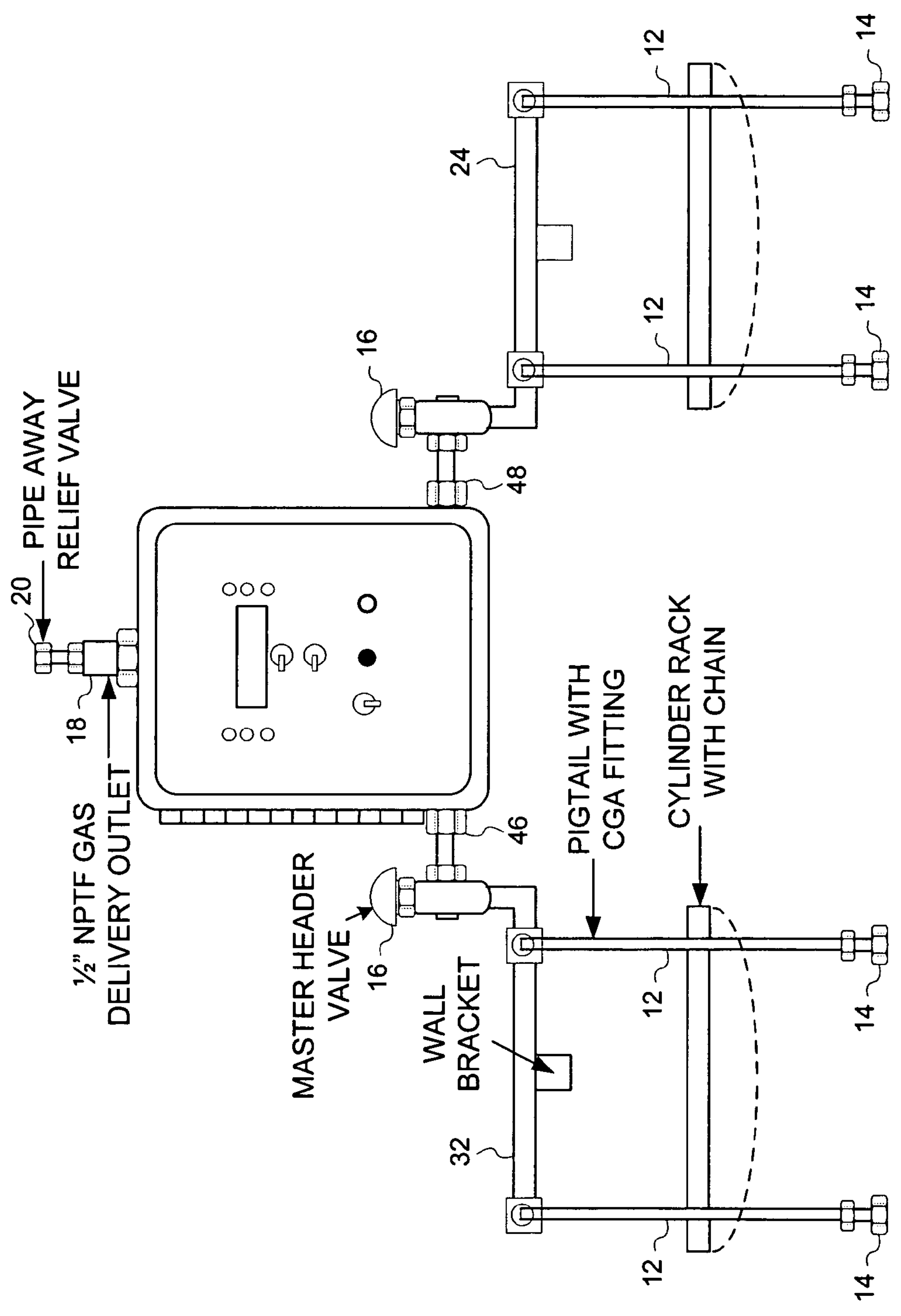
FIG. 1 illustrates a gas manifold box connected to two gas supplies.

Detailed embodiments of the present invention are disclosed herein. However, it is to be understood that the disclosed embodiments are merely exemplary of the invention, which may be embodied in various forms.

The present invention provides a gas manifold that provides an uninterrupted supply of gas and switches between at least two gas sources. This gas manifold couples to a first gas source and at least one additional gas source. The pressure transducer at the inlet reads the pressure associated with the individual gas source. A downstream pressure regulator of each pressure transducer regulates the pressure of gas supplied to a three-way valve or multiple-way valve, which is operated by a control system that directs which gas source will be used to provide gas to the outlet line. This control system will monitor the pressure as read by the pressure transducer at the gas inlets to determine which gas source will be placed on service depending on user preferences. This control system will then direct the operation of the three-way valve to effect those choices. The present invention provides a significant technical advantage by providing uninterrupted gas supplies to a gas-consuming system. Furthermore, the present invention provides a system of determining when a gas source must be replenished or is experiencing a fault condition.

The present invention monitors both inlet and delivery pressure during operation. When the switchover set point is reached, a control signal sent to the changeover valve removes the depleted supply from service and places the standby supply online. LEDs on the control panel indicate the status of the individual banks of gas. For example, a green LED may indicate which supply bank is in use, while an amber LED indicates which standby bank is ready for use and the red LED indicates the empty bank that needs re-supply or service. The "in use" or "standby" condition occurs when either side has a pressure that is a pre-determined amount higher than the switchover set point. One embodiment uses 20% as this pre-determined amount. An empty condition occurs when either or both banks pressure fall below the calibrated switchover pressure. When first applying a right or left bank pressure to the system, this bank will be the primary supply. The second bank will be shown as the standby bank. When the in-use bank reaches the switchover point, the standby LED turns green and the in-use bank changes from green to red indicating that bank needs re-supply or service. If the delivery pressure equals the set point, the LCD display will flash a message to indicate the condition. Also a relay will actuate to give an optional remote status panel the out-of-tolerance condition via dry contacts. Leak detection on the standby bank occurs when a bank gas supply is connected, turned on, and has a slow leak. The system stores the inlet pressure after it detects the change from empty status to standby status. If the standby supply decreases by 20% while in standby, a leak has been detected. An alarm condition exists and again a relay contact will notify the remote status panel or provide dry contacts to supply and an alarm condition.

FIG. 1 depicts the gas manifold as provided by the present invention properly coupled to a plurality of gas supplies. As shown here, gas manifolds can, coupled to gas cylinders (not shown) via pigtail 12, having a fitting 14 which secures the connection to the gas cylinders. The pigtail allows the gas to flow from the cylinders or other like source to a header having master head valve 16 which allows the gas source to be isolated from gas manifold 10. A gas delivery outlet 18 couples the gas manifold to a process or other like a gas-consuming system. Relief valve 20 provides over pressure protection to the piping associated with gas manifold box 10.

The present invention provides an advantage over previous systems that merely place full cylinders on a depleted side. Such pressure switch type arrangements automatically place the new full cylinders on service allowing the opposite side to become slowly depleted over time. Prior systems do not automatically select and keep the reserve cylinders on service, thus not allowing a cylinder to be completely depleted.

The present invention does not use a pressure differential system as provided by prior art solutions, rather the present invention utilizes in-line pressure transducers to monitor the supply pressures of gas manifold box 10.

Figure 2:
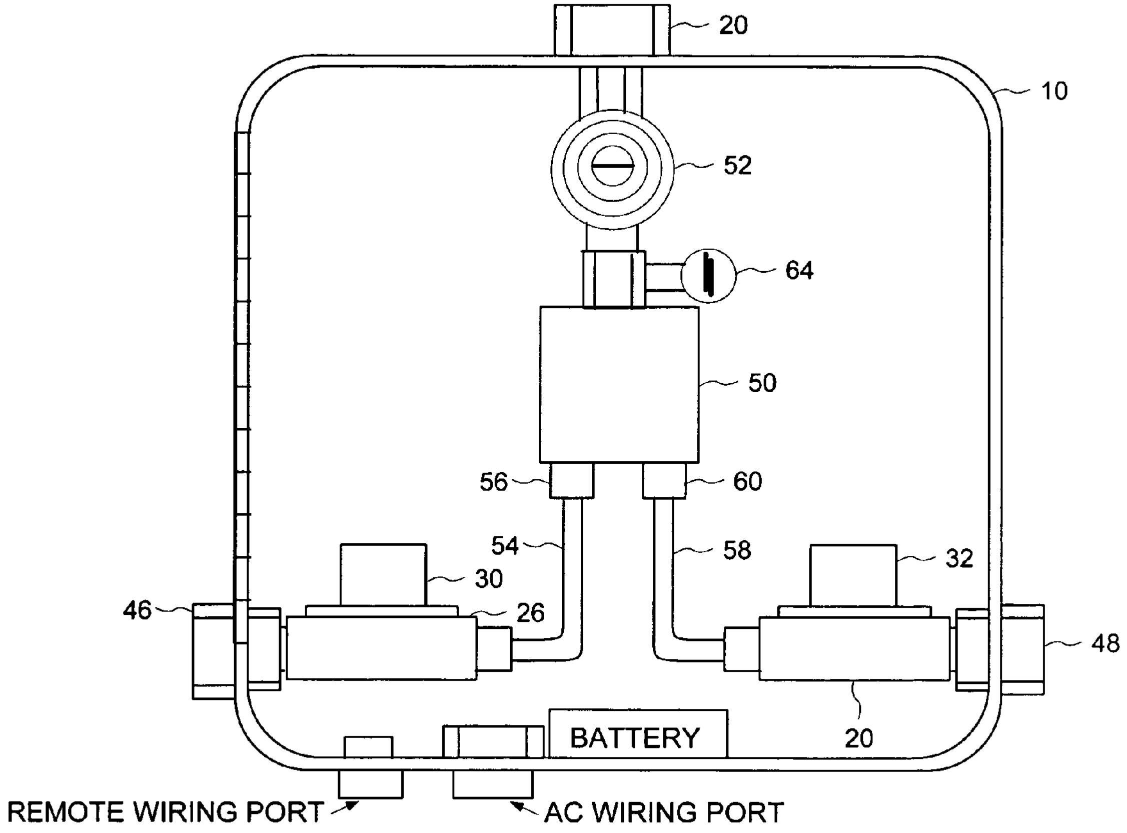
FIG. 2 provides a mechanical drawing of the interior of an embodiment of the present invention.

FIG. 2 better illustrates the details of the gas manifold box where on-line header 22 and reserve header 24 couple to regulators 26 and 28 respectively. Pressure transducers 30 and 32, in-line with pressure regulators 26 and 28 examine and provide a pressure signal to a control circuit that compares that signal with an electronic set point stored in memory. When a supply reaches the set point, the on-service gas supply is removed from service and the reserve supply is placed on service until the reserve is depleted to a particular set point as monitored by pressure transducer. When the reserve supply comes on line, the reserve supply becomes the on-line gas supply while the previous on line supply becomes the new reserve supply once it has been replenished.

Mounted in the walls of the gas manifolds box 10 are inlet connectors 46 and 48 and outlet connector 50. Inlets 46 and 48 are connected to pressure regulators 20 and 28, which are in turn connected to the electrically operated three-way valve 50. The third port on the three-way valve is connected to output pressure regulator 52, which is connected to outlet connector 50. Gas from online header 22 connected to inlet 46 flows through regulator 26 and pipe 54 to inlet port 58 of valve 50. Similarly, gas from reserve header 24 connected to inlet 48 flows through regulator 28 and pipe 59 to inlet port 60 of valve 50. The position to which valve 50 is set determines whether gas from pipe 54 or 58 flows to the port 62 of valve 50. From port 62 of valve 50, gas flows through regulator 52 to outlet connector 50.

Figure 3:
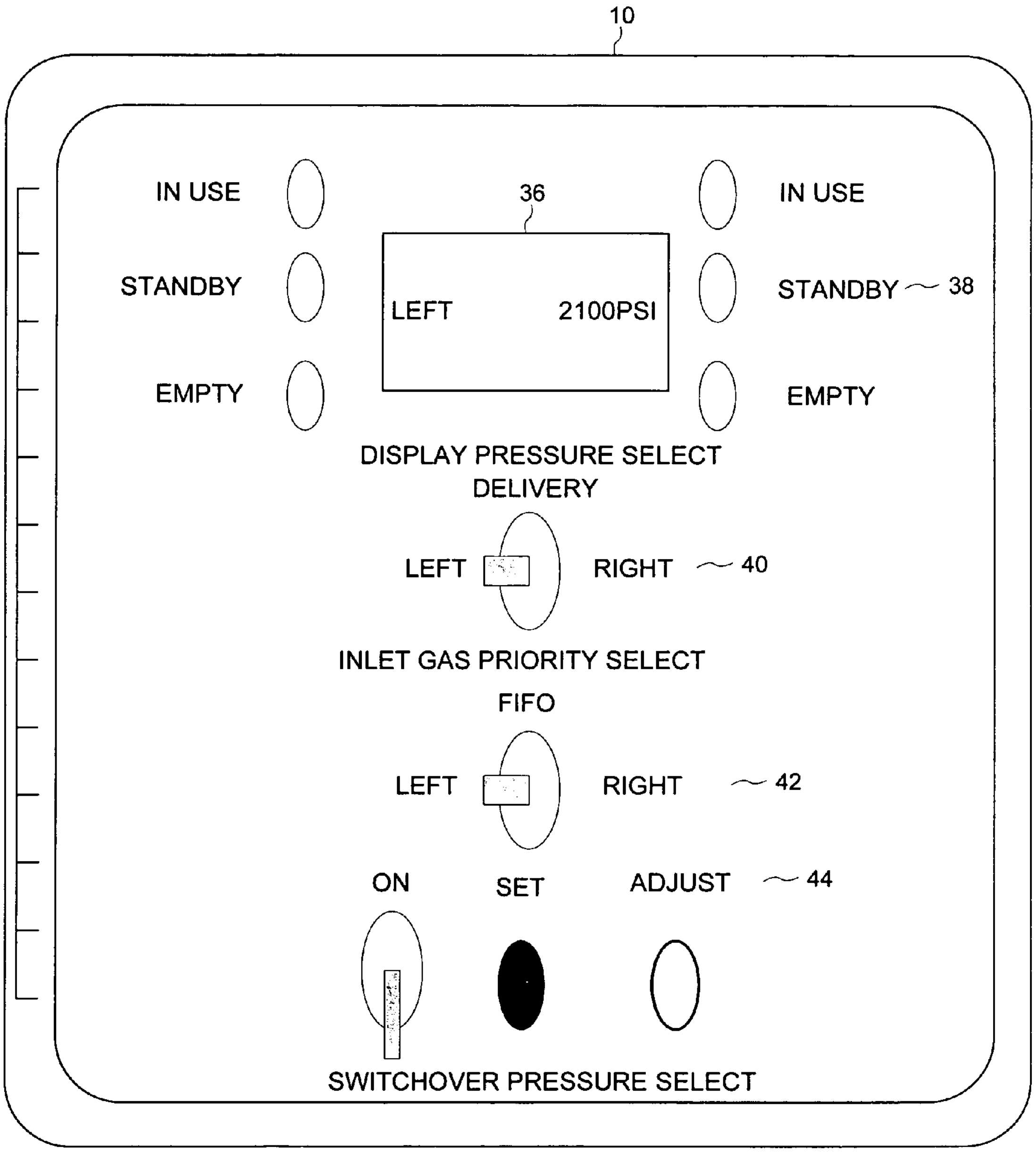
FIG. 3 depicts the front panel of one embodiment of the present invention.

FIG. 3 depicts the exterior control panel associated with gas manifold box 10. LCD panel 36 on the exterior of gas manifold box 10 provides a digital readout of the chosen gas supply for cylinder bank contents, pipeline delivery pressure, and display switchover pressure when calibration is selected. Status lights 38 for each cylinder bank indicate the gas supply status. Green indicates bank and operation, amber indicates which bank is standby and ready for use, while a red status light indicates that the respective gas supply requires service. Switch 40, the display pressure select, allows a user to choose the right, left or delivery pressure to be displayed on LCD display panel 36. Beneath display pressure select switch 40 is inlet gas priority select switch 42. Inlet gas priority select switch 42 allows the user to select which gas supply has priority as the primary gas source. The three settings shown in FIG. 3 are FIFO, which is the default setting for normal operations. In FIFO, the primary side will alternate as cylinder banks are depleted and replenished. Additionally, a user may select the left or right bank as the primary bank. When the left or right bank is selected, that bank is served as a priority side. In this position, the selected bank becomes the in-use supplier of gas at start up, and returns to primary when the gas supply on this side has been changed out after being depleted. Beneath inlet gas priority select switch 42 lies Switchover Pressure Select 44. Switchover Pressure Select switch 44 is normally in an off position. This switch is activated when a user desires to change the switchover pressure, setpoint, the pressure at which the manifold will remove the on-line cylinder bank to the reserve gas supply. Switch 44 is selected to the "on" position to allow a user to adjust the pressure setpoint that the setting to the desired switchover pressure. Once this pressure is displayed, it may be set as the switchover pressure. There may be independent settings for both the right and left bank. Returning to FIG. 2, within gas manifold box 10, delivery regulator 52 allows for a manual adjustment to be made with gas flowing. Internal gage 64 reads the inlet pressure provided to regulator 52. Delivery pressure downstream of regulator 52 may be shown on LCD display 36 when Display Pressure Select switch 40 is in the delivery position.

Figure 4A:
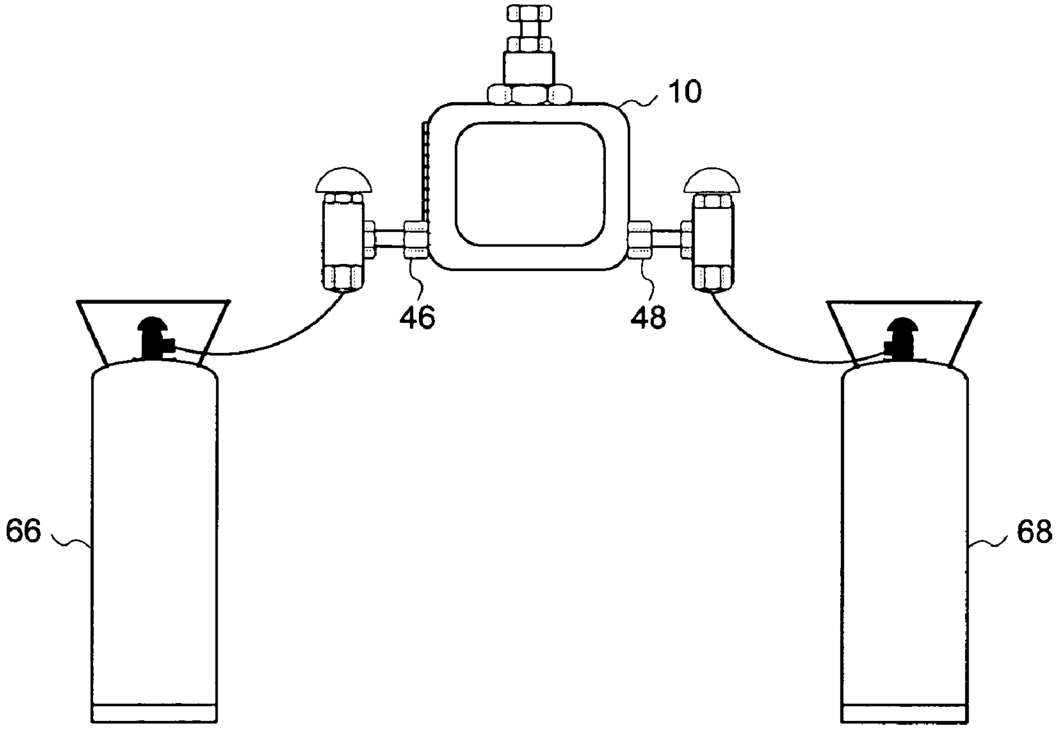
FIGS. 4A–4D depict various configurations of the present invention coupled to low pressure liquid gas sources and/or high pressure gas services.
Figure 4B:
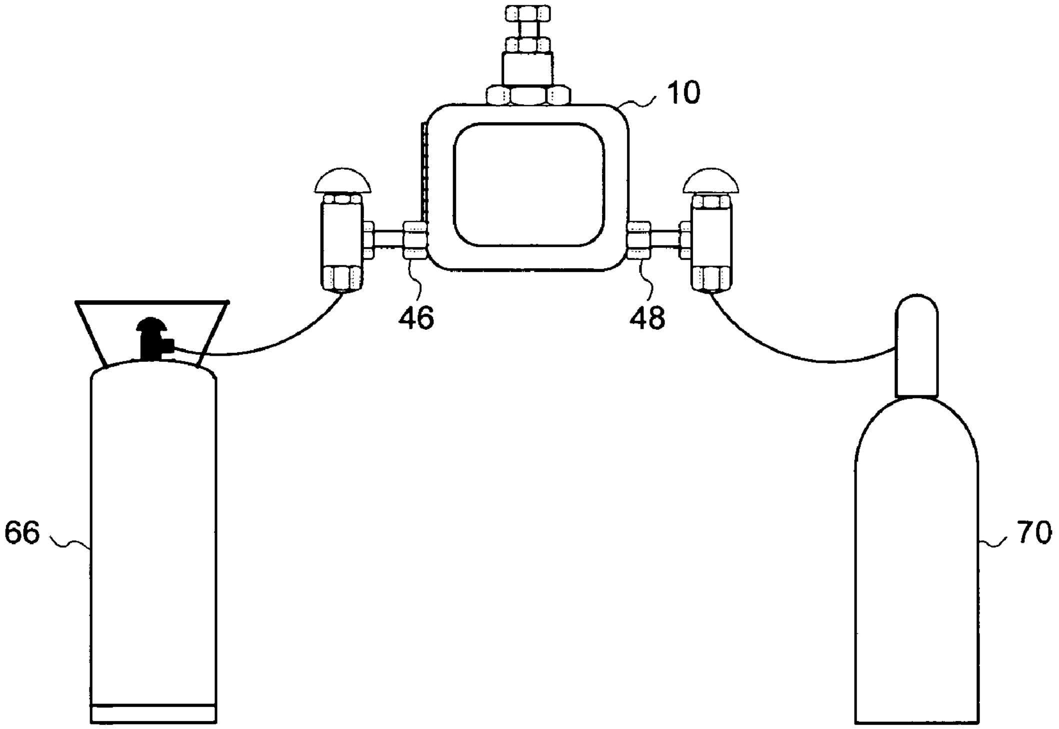
Figure 4C:
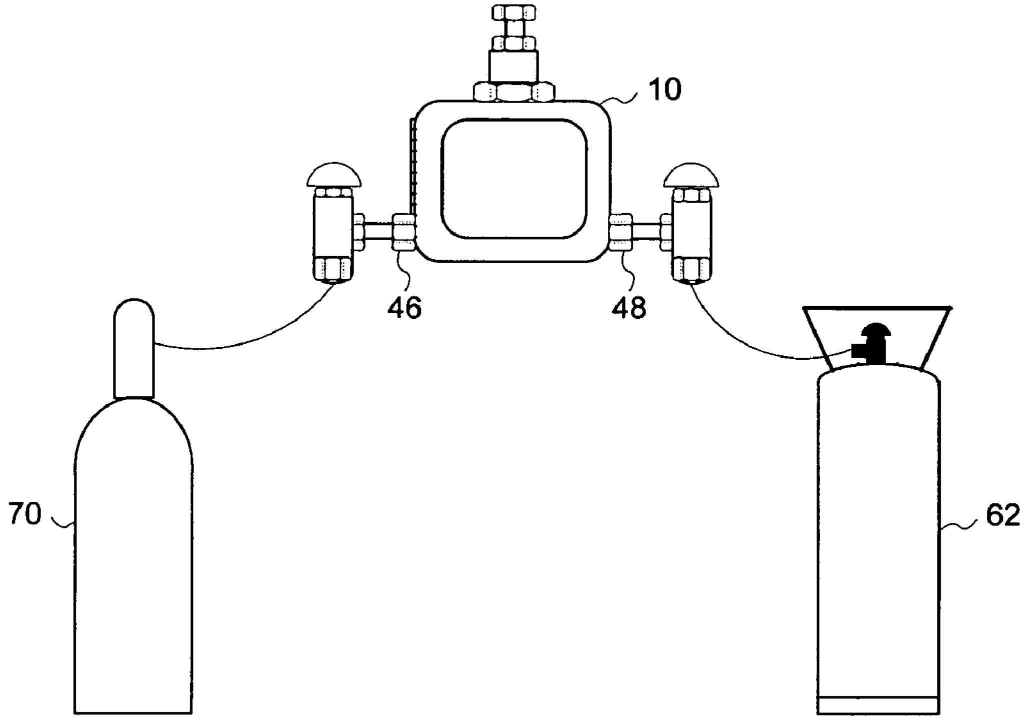
Figure 4D:
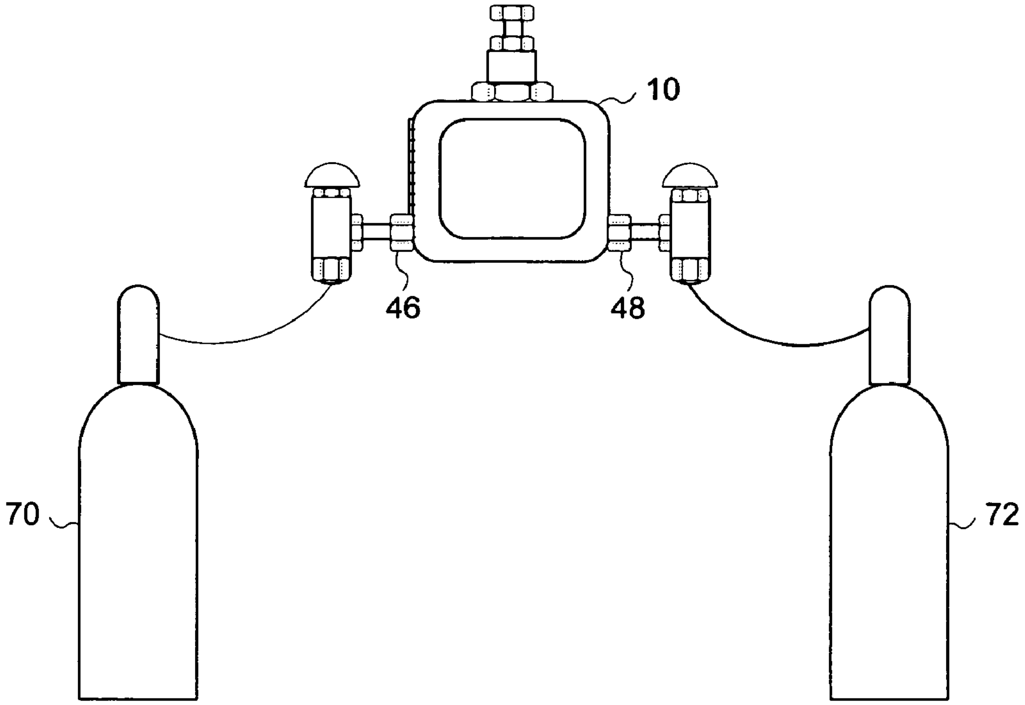

FIGS. 4A through 4D illustrate various types of gas supplies that may be coupled to gas manifold box 10. In FIG. 4A, two liquid supplies 66 and 68 couple to inlet connectors 46 and 48 respectively. A different combination is shown in FIG. 4B. Here, liquid source 66 and a gas source 70 serve as the left and right gas source respectively. This arrangement is reversed in FIG. 4C, wherein gas cylinder 70 couples to inlet connector 46 as the left bank, while liquid source 68 couples to inlet connector 48 as a liquid source. FIG. 4D illustrates an arrangement wherein two high pressure gas sources, gas cylinder 70 and 72, serve as the gas supply coupled to inlet connectors 46 and 48 respectively.

FIGS. 4A through 4D illustrate that various gas combinations can be used with gas manifold 10. This allows users to mix or match the gas supply with the manifold. In FIGS. 4B and 4C where a low pressure liquid cylinder is utilized with a high pressure gas cylinder, the liquid cylinder is often selected as the priority gas source. This reduces the possibility that a liquid source will build up pressure over time, wherein the pressure is released to atmosphere through a relief located on the liquid cylinder. Additionally, it is highly desirable when using a low pressure liquid cylinder and a high pressure gas cylinder to select the low pressure liquid cylinder as the primary source; thus, when the liquid cylinder reaches the switchover set point, the high pressure gas cylinder becomes the on service gas supply while the liquid cylinder is replenished. Once the gas cylinder has been replenished, the liquid cylinder returns to service as the primary gas source. The present invention greatly simplifies the required hardware associated with having a liquid gas supply and high pressure gas backup.

Figure 5:
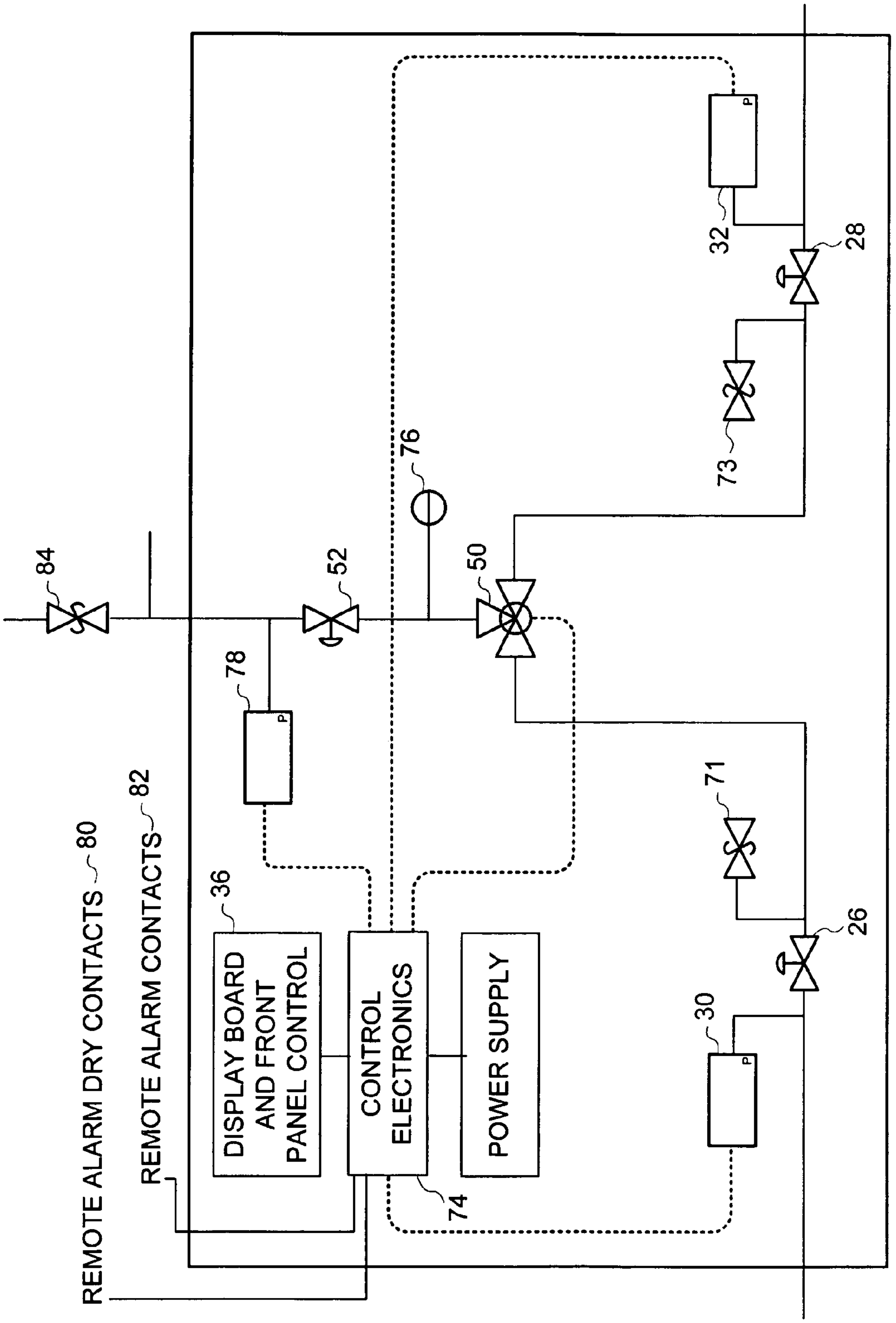
FIG. 5 is a block diagram, schematically representing one embodiment of the present invention.
Figure 6:
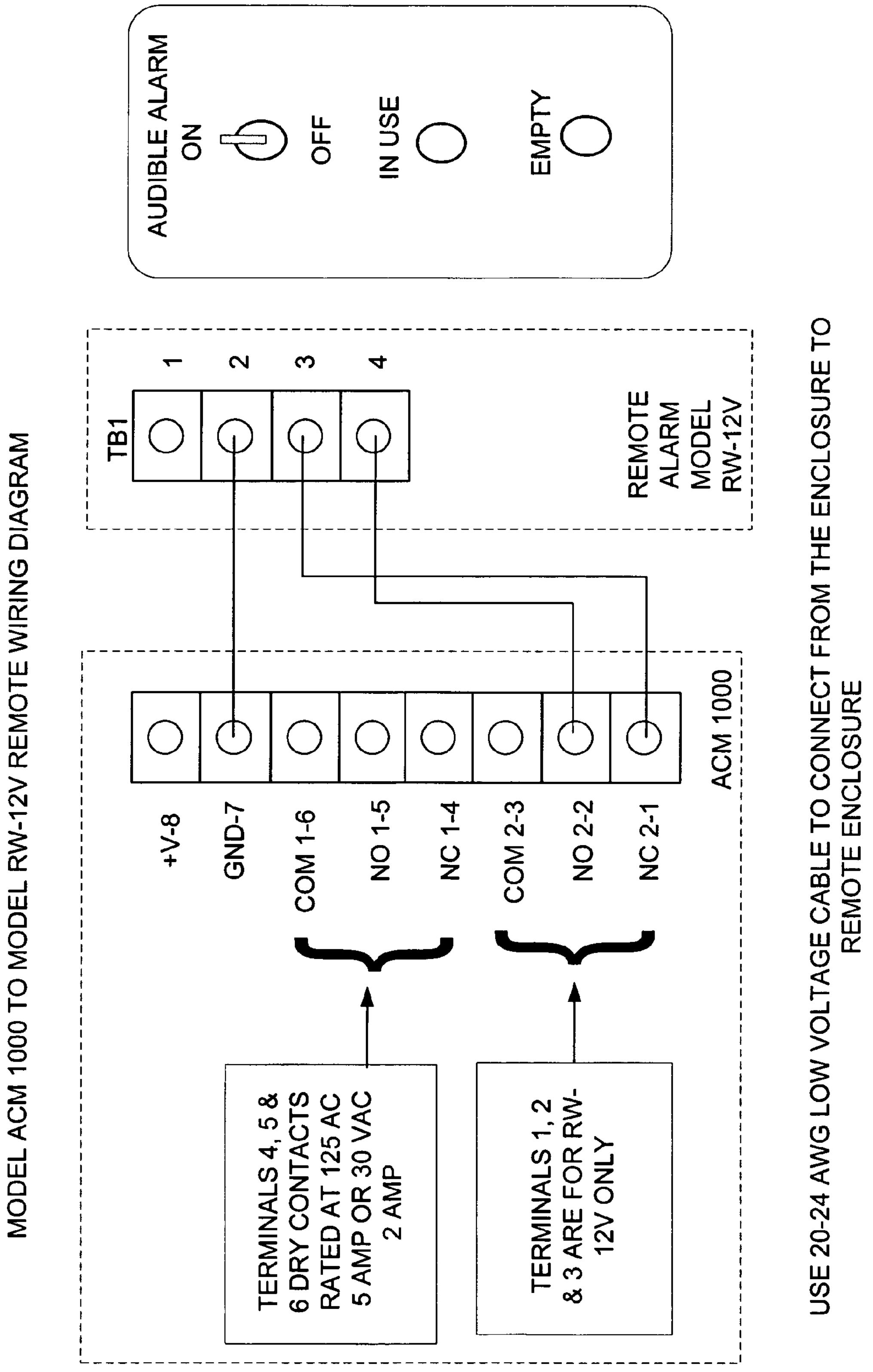
FIG. 6 provides a block diagram, schematically representing the electrical outputs from the control board to a remote alarm.

FIG. 5 shows a mechanical and electrical block diagram of the functions within gas manifold box 10. As stated earlier, gas flows into inlet regulators 26 and 28 from the on service and reserve gas supplies. Pressure relief valves 71 and 73 prevent piping between pressure regulators 26 and 28 and three-way control valve 50 from being over-pressurized. The relief valve setting may be manually set, may be a function of the individual relief valve or may be a controlled set point. Pressure transducers 30 and 32 provide a signal to control electronics 74. Control electronics direct control valve 50 to select either the left or right bank as the gas supply. The downstream pressure from control valve 50 is manually sensed by pressure gage 76. Deliver pressure regulator 52 regulates downstream pressure or outlet pressure of gas manifold box 10. Sensed Pressure transducer 78 senses outlet pressure and provides a signal to control electronics 74, which in turn generates a display of the delivery pressure on LCD panel 36. Control electronics 74 may also be coupled to a remote alarm or other like system as is known to those skilled in the art. As shown in FIG. 6, control electronics 74 drive remote alarm contacts 80 and 82. Pressure relief valve 84 ensures that an over-pressured condition does not occur within the delivery outlet delivery lines from the gas manifold box.

FIG. 6 provides a remote wiring diagram, wherein control electronics 74 are used to drive a remote alarm. As shown, there are two outputs for external alarms. External alarms may be located near or far from the gas manifold. As shown, the alarm may be powered by DC from the manifold with intrinsic safe power requirements. The alarm shown in this embodiment has three indicators. A green status light indicates when a manifold has bank gas pressures above the switchover set point. Green status lights will not illuminate when a gas supply pressure drops below the switchover set points. A red status light indicates that either gas supply has a pressure at or below the switchover set point. The status light will remain red until the empty gas supply bank has been replaced or replenished with a supply pressure greater than the switchover set point.

Additionally, an audible alarm may sound when the empty light is illuminated and the remote alarm is enabled. This alarm condition will also remain until the empty gas supply is either replaced or replenished or the alarm is cut out. In one embodiment the inlet pressure on an empty bank must increase a pre-determined percentage, such as 25 percent above the switchover set point, in order to cause the status of the empty gas supply to be returned to a standby condition.

The present invention provides a significant improvement over existing systems. The control electronics within the gas manifold box allow the switchover pressure to be easily tailored to individual user requirements. Either gas supply can be set to switchover at the same setting, or each gas supply can be individually be set to switchover at an independent setting.

The present invention provides a significant technical advantage by allowing users to electronically set the switchover setting as opposed to the difficult mechanical adjustment typically found in prior art solutions.

Figure 7:
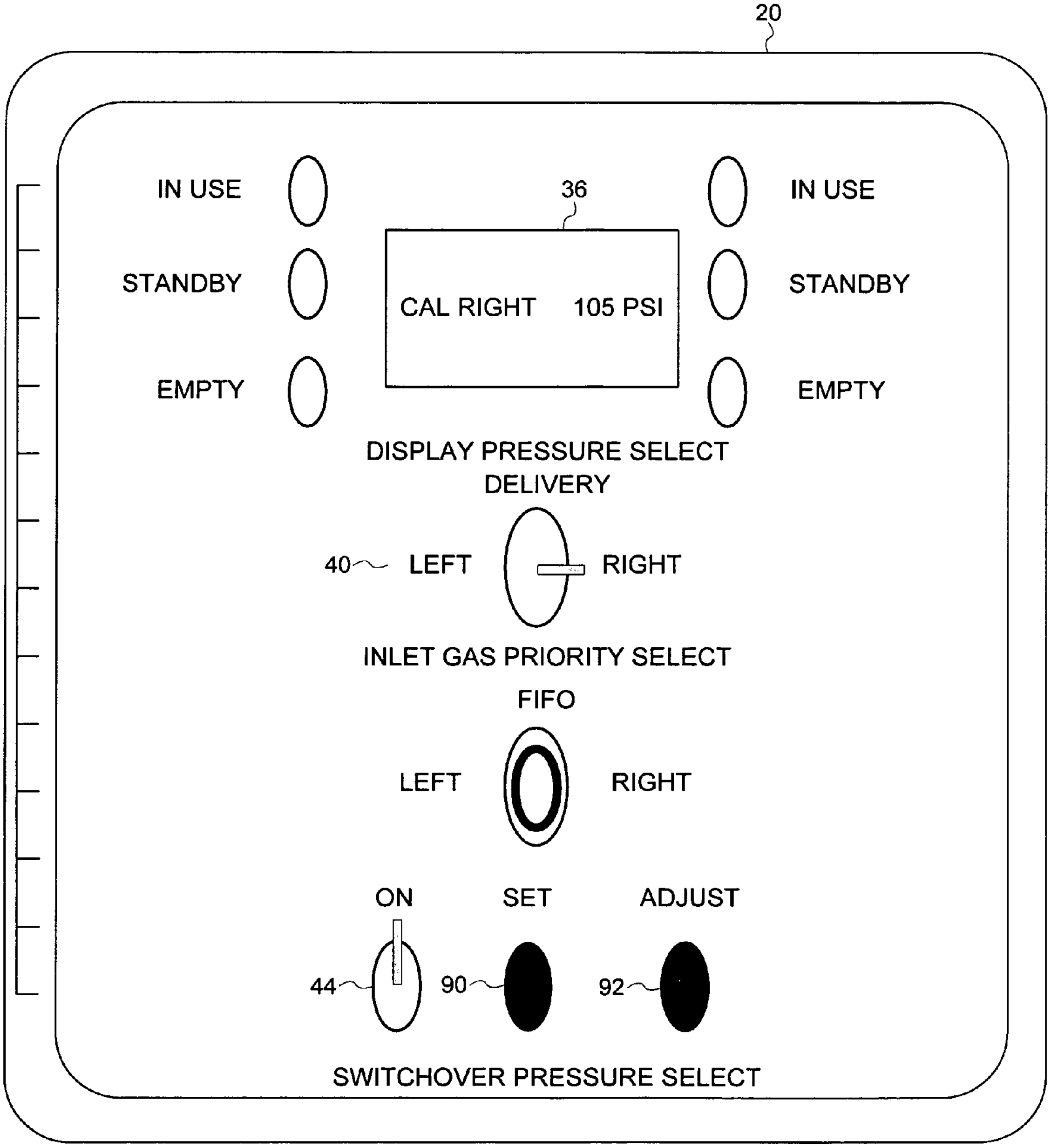
FIG. 7 provides an illustration of the control panel on the front of the gas manifold box.

FIG. 7 depicts the front panel controls of gas manifold box 10, which are utilized to adjust the switchover set point of either gas supply. In order to adjust the Switchover Pressure Set Point, Set Button 90 is held firmly and then released. The Display Pressure Select Switch 40 is selected to either the left or right gas supply. Once this selection is made, Set Button 90 is firmly depressed and released after the switchover pressure select switch is switched over to the "on" position. Adjustment knob 92 manipulates a potentiometer or other like device to adjust the desired Switchover Set Point by turning the Switchover Pressure Select Adjustment Knob 92 either clockwise to increase the switchover pressure setting, or counter clockwise to decrease the switchover pressure setting. This setting is displayed within LCD panel 36. Users typically verify the desired switchover pressure setting on LCD panel 36 and press set button 90 to store the switchover pressure for the selected gas supply. Again, this procedure may be repeated for the opposite gas supply.

Gas manifold box 10 typically preset for switchover pressures at the factory with the following pressures as shown in Table 1. The default conditions of gas manifold box 10 are illustrated in Tables 1 and Tables 2, which display the switchover pressures and the gas priority defaults associated with one embodiment of the present invention.

TABLE 1

| | |
|---|---|
| Oxygen, Inert & Fuel gas w/o Flashback Arrestor 0–200 psig range | 250 PSIG |
| Oxygen, Inert & Fuel gas w/o Flashback Arrestor 0–125 psig range | 100 PSIG |
| Fuel Gas with Flashback Arrestor | 70 PSIG |
| Acetylene | 70 PSIG |

TABLE 2

| | |
|---|---|
| Display Pressure Select | Delivery |
| Inlet Gas Priority Select | FIFO (First In First Out) |
| Switchover Pressure Select | Off |

The present invention provides a standby or reserve gas supply at all times. Hence, a leak on the standby cylinder or gas supply is automatically detected. When the pressure of the reserve supply decreases by a predetermined amount from the original measured pressure, the status lights to the left or right of LCD panel 36 will signal a leak. In one embodiment, the amber and red status lights blink to indicate that a leak within their respective bank has been detected. Gas manifold box 10 will continue to operate with the on-line supply, however, a user will be alerted to the leak prior to placing a leaky system on service, and the leak must be cleared in order to have the display return to normal operation.

The present invention uniquely provides different switchover pressures that may be may be associated with different types of gas, thus the present invention allows a standardized gas manifold box to be used and adapted easily to a variety of supply gases. This differs greatly from prior art solutions, which required careful manual calibration based on individual gases and individual mechanical components. Present invention may be associated with a variety of uses for the delivery of gases. This includes delivery of process gases and manufacturing, as well as the delivery of medical gases within a hospital or doctor's office type environment. The gas manifold box provided by the present invention may be modified to accommodate the high purity requirements of some processes or medical uses. On a medical application, two delivery regulators are typically found within the gas manifold box. This second regulator is required in order to properly service and deliver medical gases, while providing 100 percent redundancy.

Figure 8:
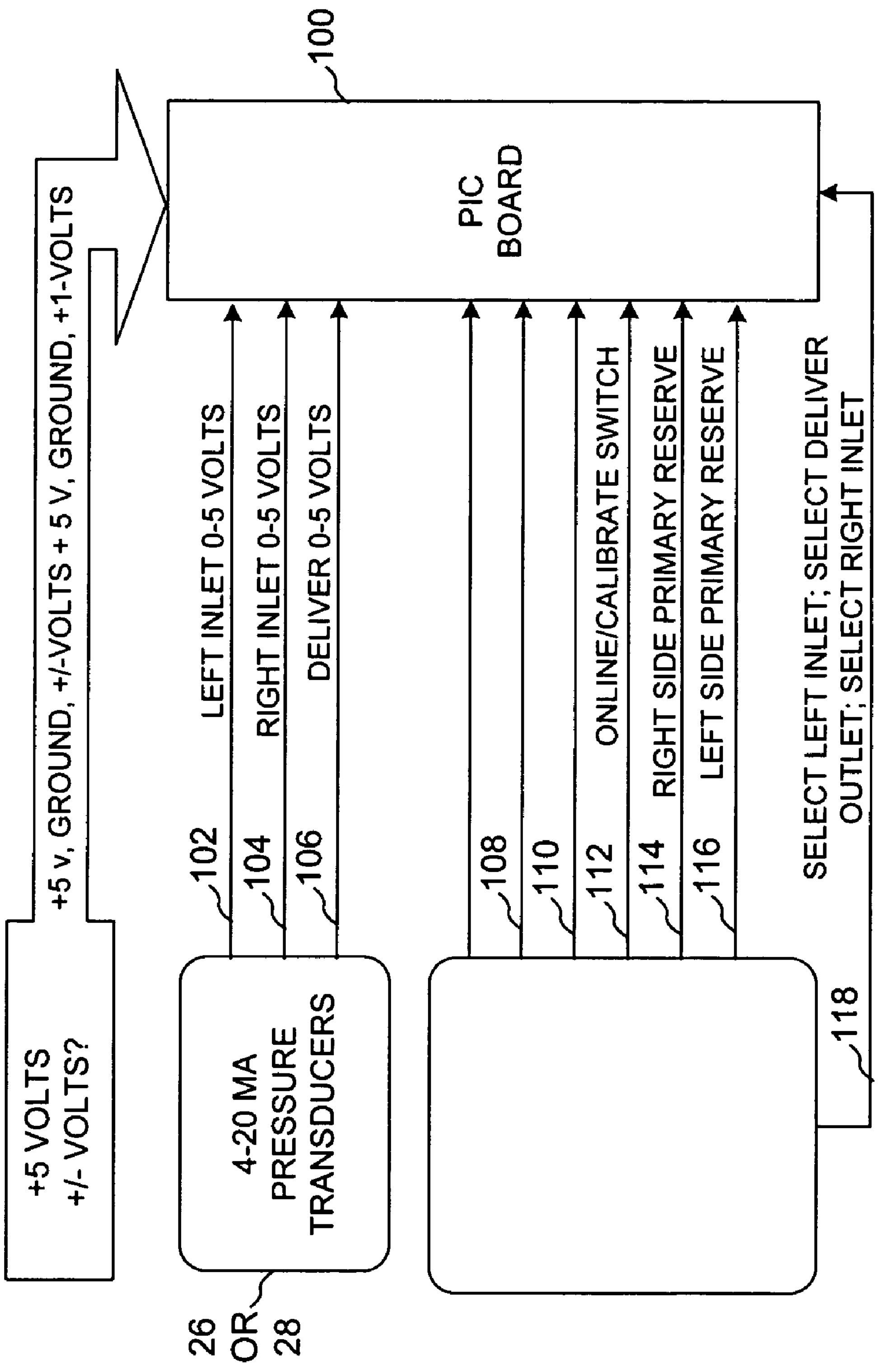
FIG. 8 is an electrical schematic diagram of the front panel circuit board.

FIG. 8 provides a block diagram showing the input electrical connections to the front panel circuit board 100. Signal lines 102, 104, and 106 carry analog signals from the pressure transducers in the left inlet, right inlet and outlet to circuit board 100. Lines 108, 110, and 112 carry signals from the Switchover Pressure Select controls described in FIG. 2. Line 108 carries the analog signal from the Adjust potentiometer, line 110 carries the closed/open signal from the Set pushbutton, and line 112 carries the closed/open signal from the On/Off toggle switch. Lines 114 and 116 carry signals representing the position of the three-position Inlet Gas Priority switch. Line 118 carries a signal representing the position of the three-position Display Pressure Select switch.

Figure 9:
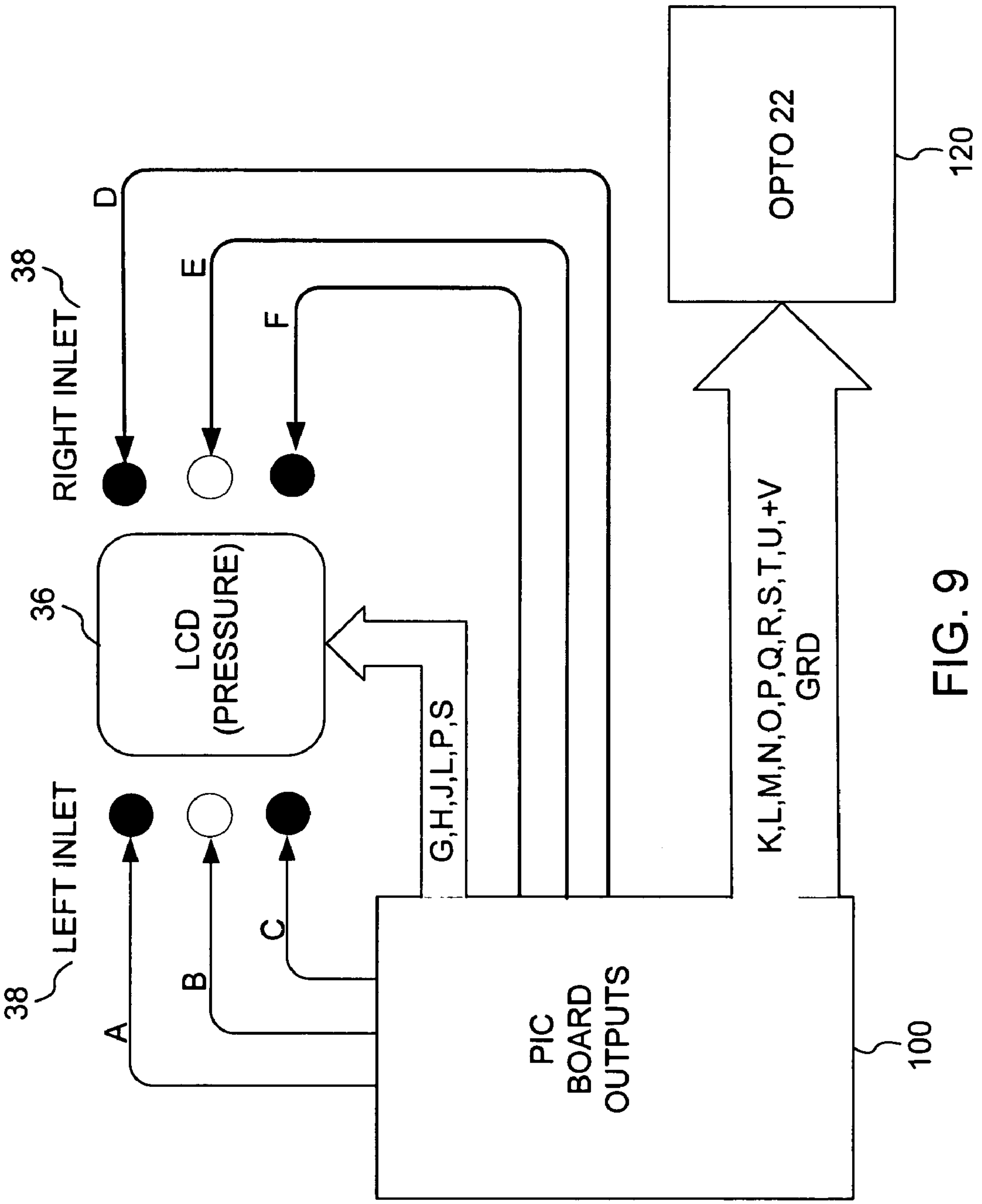
FIG. 9 depicts the output electrical connections from circuit board.

FIG. 9 depicts the output electrical connections from circuit board 100. Connections include signals to LCD Panel 36 and the System Status Lights of FIGS. 3 and 7. Optoisolator 120 provides connections to external signaling devices, such as remote status indicators and alarms.

Figure 10A:
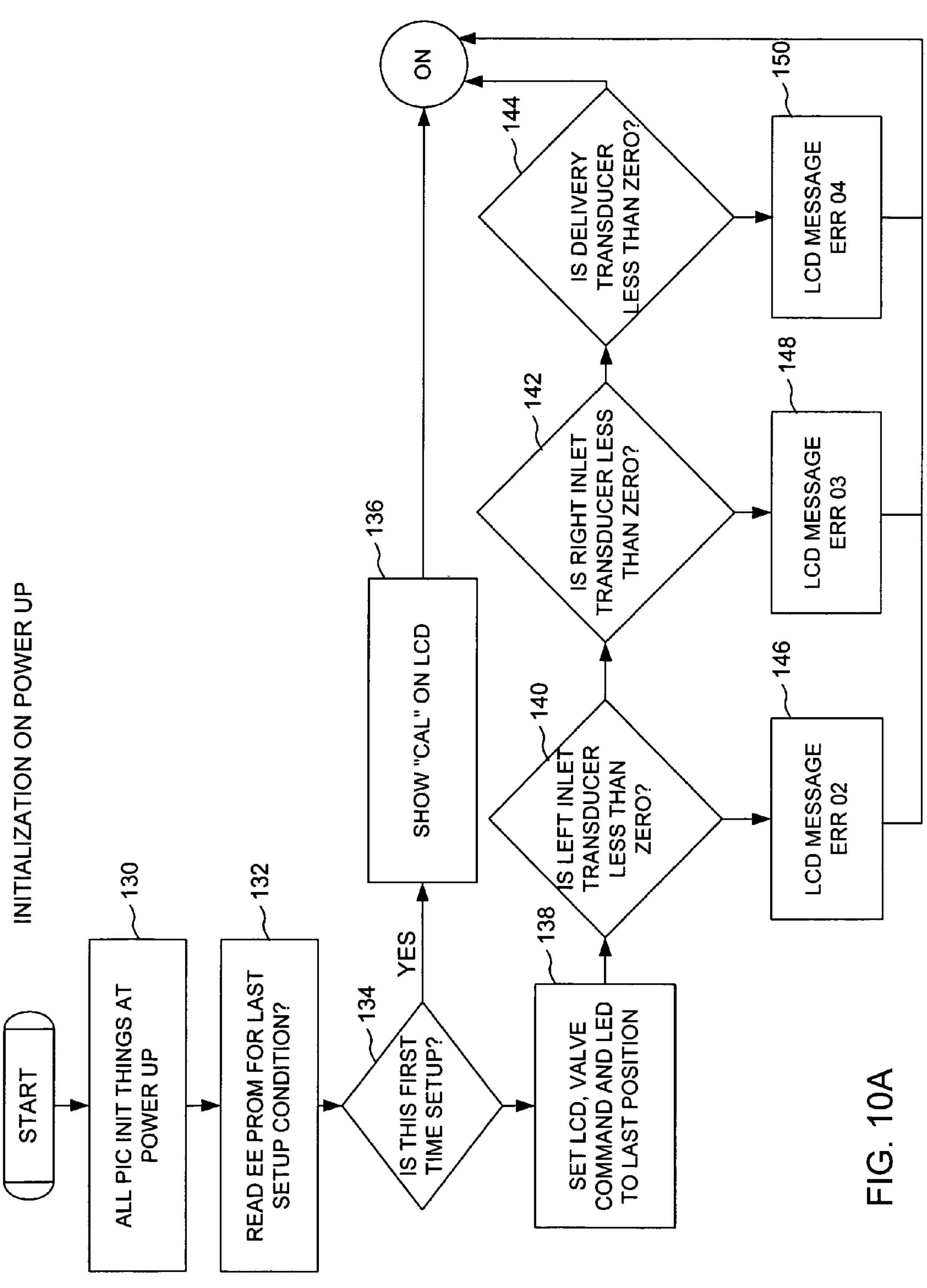
FIGS. 10A–10E are a flowchart of the manifold control logic firmware of the processor board of an embodiment of the present invention.

FIGS. 10A–10E depict the logic flow of the program executed by the microcontroller of an embodiment of the present invention. In FIG. 10A, at step 130, the microcontroller initializes itself and checks the pressure transducers for error conditions.

At step 132, the EE prom is read for the last setup condition. This read is evaluated at decision point 134, where a determination is made as to whether or not this is a first-time setup. If this is a first-time setup, LCD panel 36 of FIG. 2 will display "cal" in step 136. Otherwise, at step 138, the LCD, valve command and LED status lights are set to their last known position. Determinations are made in step 140, 142, and 144. These include in step 140 and 142 determining whether the inlet pressure transducers read less than zero. If so, error messages 146 and 148, respectively result. Similarly, the delivery transducer pressure is determined at decision point 144, wherein a pressure reading of less than zero results in an error message, 150.

Figure 10B:
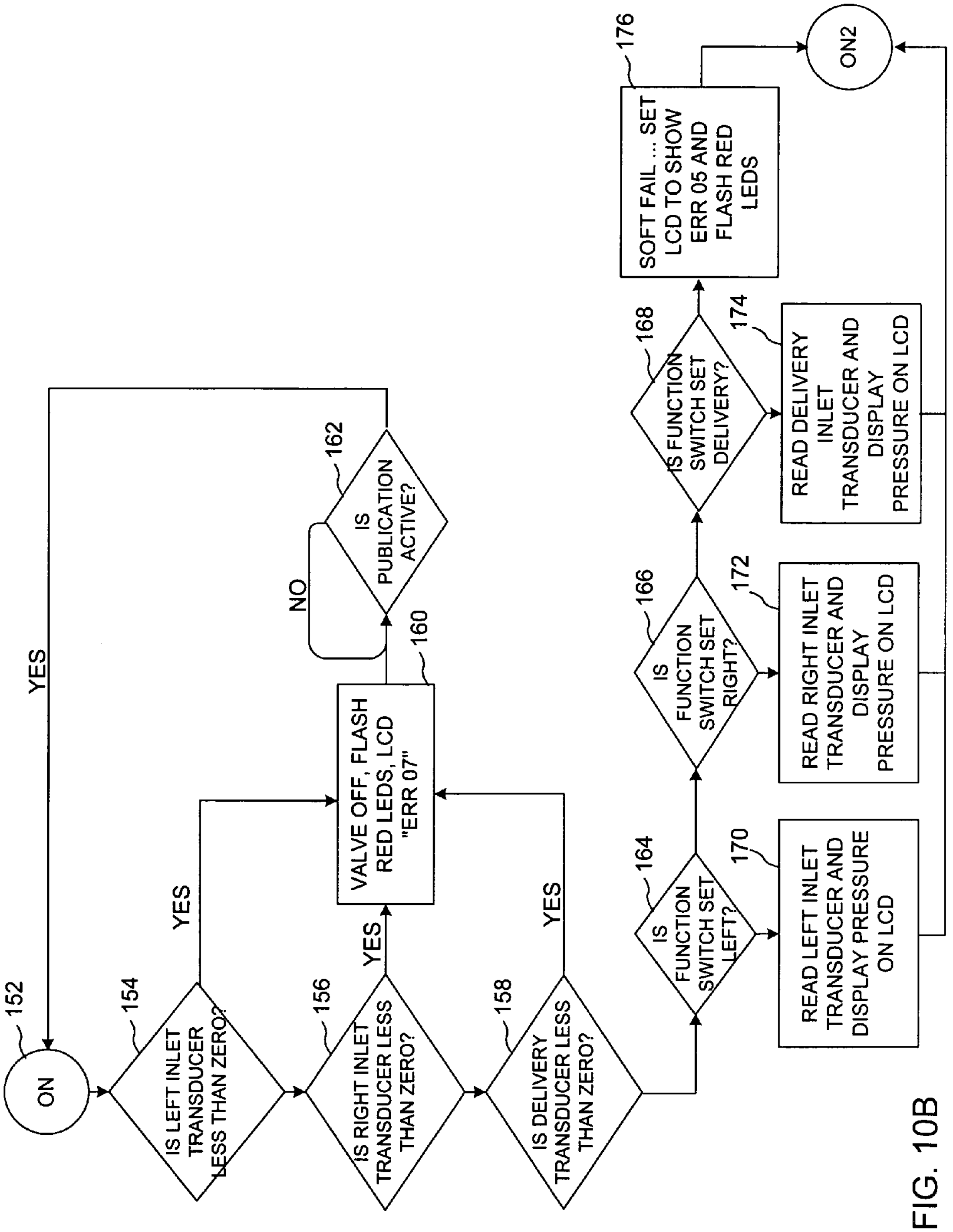

In FIG. 10B, the microcontroller performs further error testing and, based on the status of the Display Pressure Select switch, displays the user-selected pressure in the LCD Window. A determination is made for troubleshooting as to whether or not the various pressure transducers read less than zero at decision-making points 154, 156 and 158. If any of the pressure transducers read less than zero, the valves will be positioned to "off" and LEDs or other air-type signals will be flashed to a user in step 160. A determination will be made in step 162 as to whether or not a push button is active. If the transducers all read greater than zero, a determination is made at decision-making point 164 as to whether the function switch is set to "left" or the function switch is set to "right" at decision-making point 166, or to "delivery" in decision-making point 168. Dependent on the position of the function switch in decision-making points 164, 166 and 168, the corresponding transducer pressure will be displayed in steps 170, 172 or 174. If the function switch is not set in one of the three positions as shown in Step 176, an error message will be displayed to alert the user.

Figure 10C:
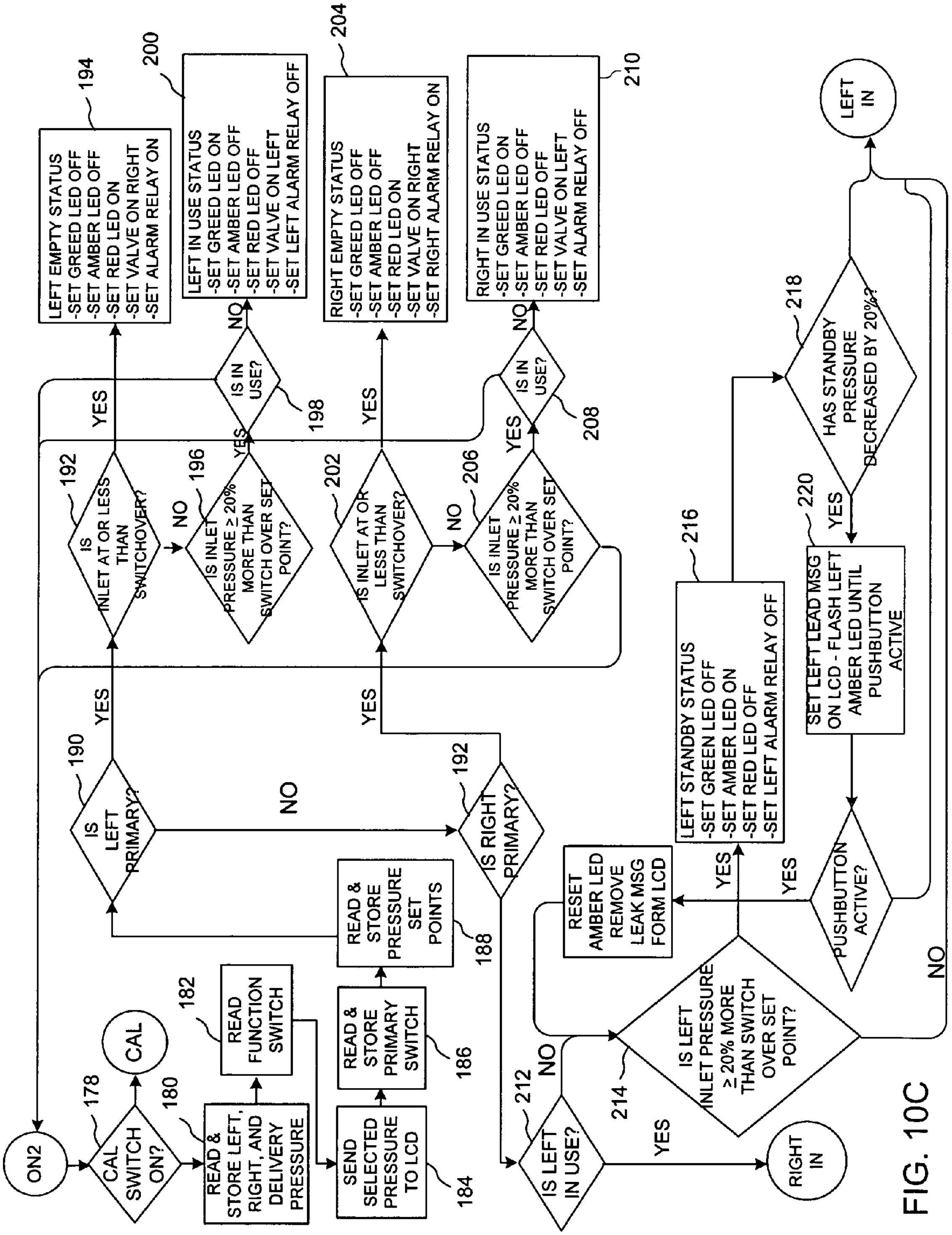
Figure 10D:
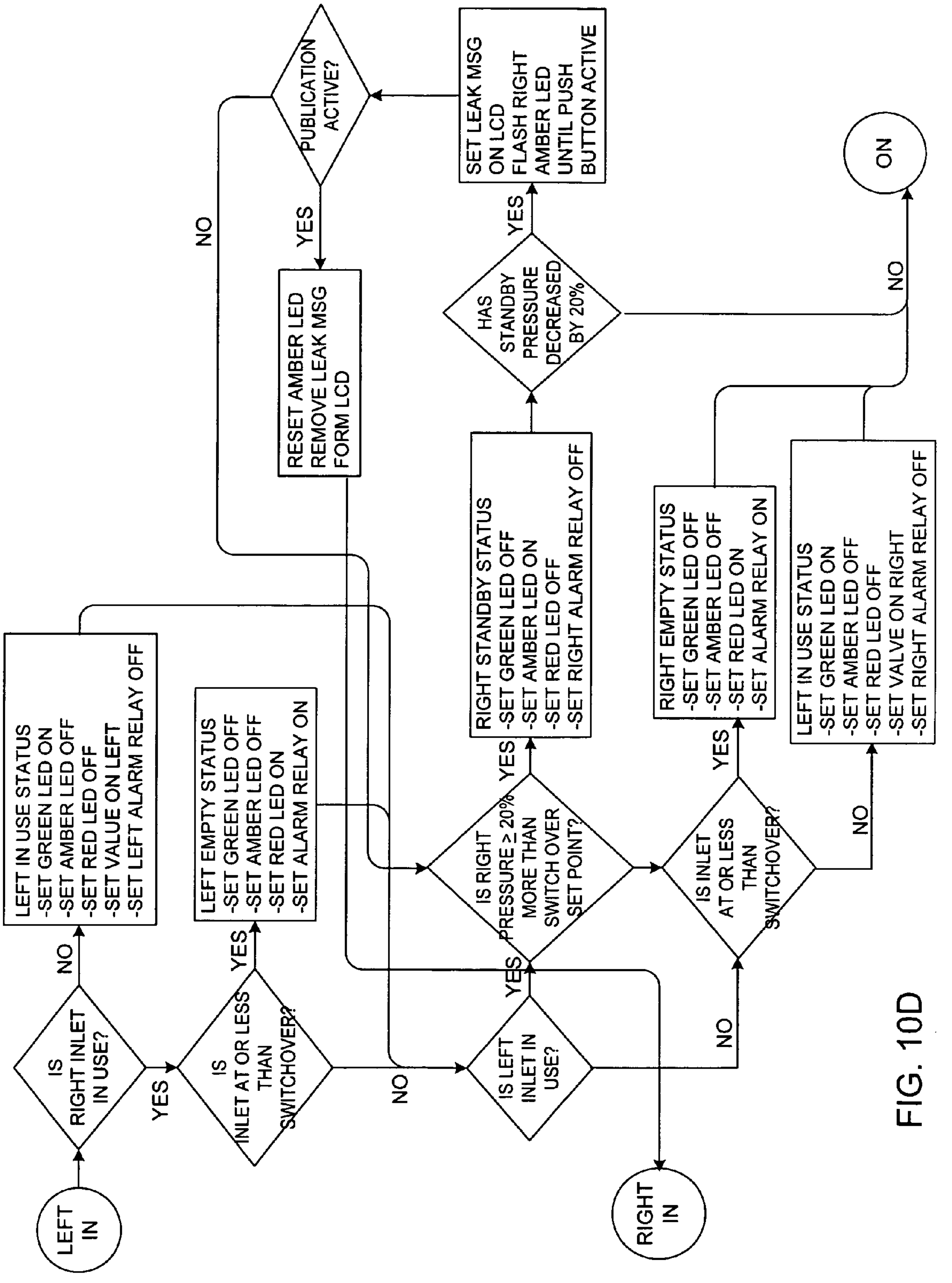

In FIG. 10C, a determination is made as to whether or not the calibration switch has been positioned to the "On" position at decision-making point 178. If the calibration switch is "on", then calibration will take place as described in FIG. 7. Otherwise, the pressure transducers are read at step 180 along with the position of the function switch in step 182. The selected pressure is then sent to be displayed on the LCD screen in step 184. Next, the primary switch position is read in step 186, and the pressure set points associated with that selection are read in step 188. Decision-making points 190 and 192 are associated with choosing the left or right gas supply respectively. At decision-making point 190, if the left gas supply is selected as the primary gas supply, the measured pressure is compared to the switchover pressure. If the measured pressure is less than the switchover pressure, status lights are set in step 194 to indicate that that gas source has an empty status. If the pressure is greater than the switchover point at decision-making point 196, a determination is made as to whether or not that gas bank is in use in step 198. If the gas supply is in use, an "In Use" display will be indicated in step 200. Otherwise, the process will repeat itself until the inlet pressure is at a predetermined percentage greater than the switchover set point. This process is repeated in Steps 202, 204, 206, 208 and 210 for the opposite gas supply.

If neither gas supply is selected as the primary, the gas supply in service at decision-making point 212 is determined by default. At decision-making point 212, if the left gas supply is not in use, the left inlet pressure is compared to the switchover set point at decision-making point 214 in order to display a proper standby status at step 216. Additionally, standby gas supply are examined in Step 218 to determine whether or not the standby pressure has decreased by a predetermined percentage since being placed in a standby condition. If the pressure has so dropped, then in step 220 a leak error message will be supplied to the user.

Figure 10E:
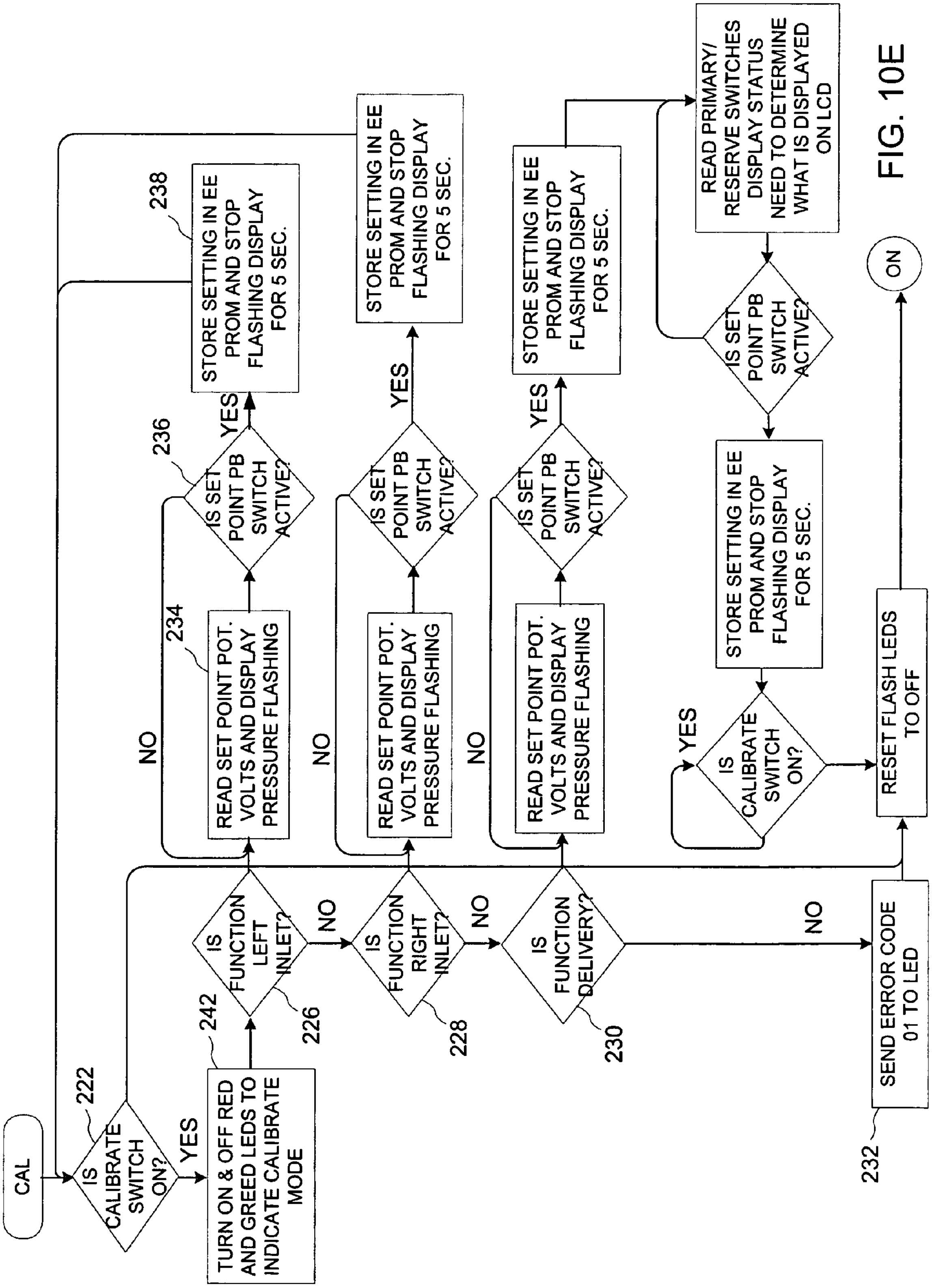

In FIG. 10E the calibration process described in FIG. 7 is further detailed. At decision-making point 222 the calibration switch is examined to either be in an "on" or "off" position. If the switch is in the "On" position, the status lights will indicate the calibrate mode at step 244. At decision-making points 226, 228, and 230, an examination determines which setpoint is to be calibrated, either the left inlet pressure switch setpoint, right inlet pressure switch set point or the delivery setpoint. If no function is selected, an error message is displayed on LCD panel 36 in step 232. Otherwise, a set point potentiometer is read and converted to a pressure reading at step 234.

Figure 11:
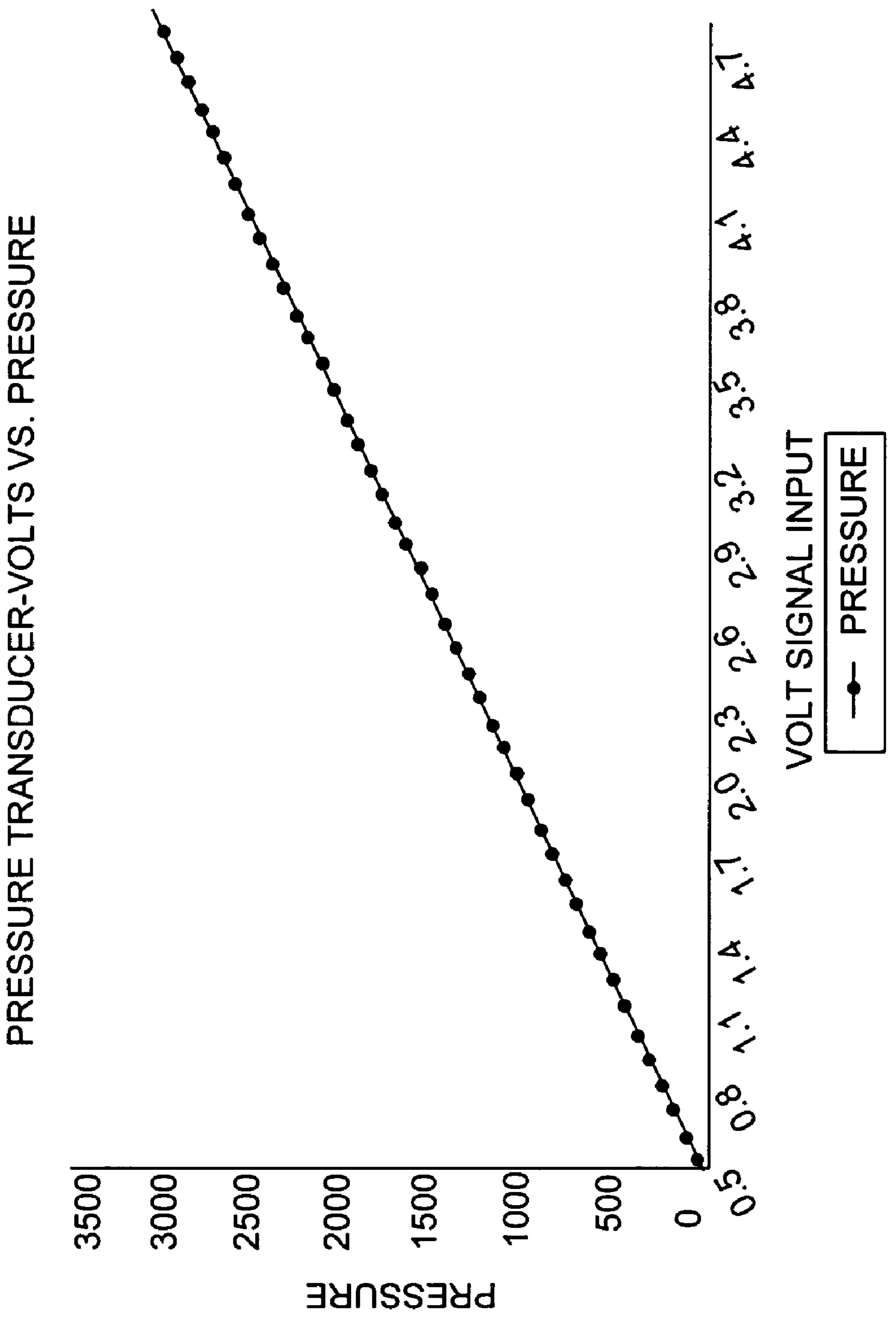
FIG. 11 illustrates the relationship between voltage and pressure associated with a pressure transducer.
Figure 12A:
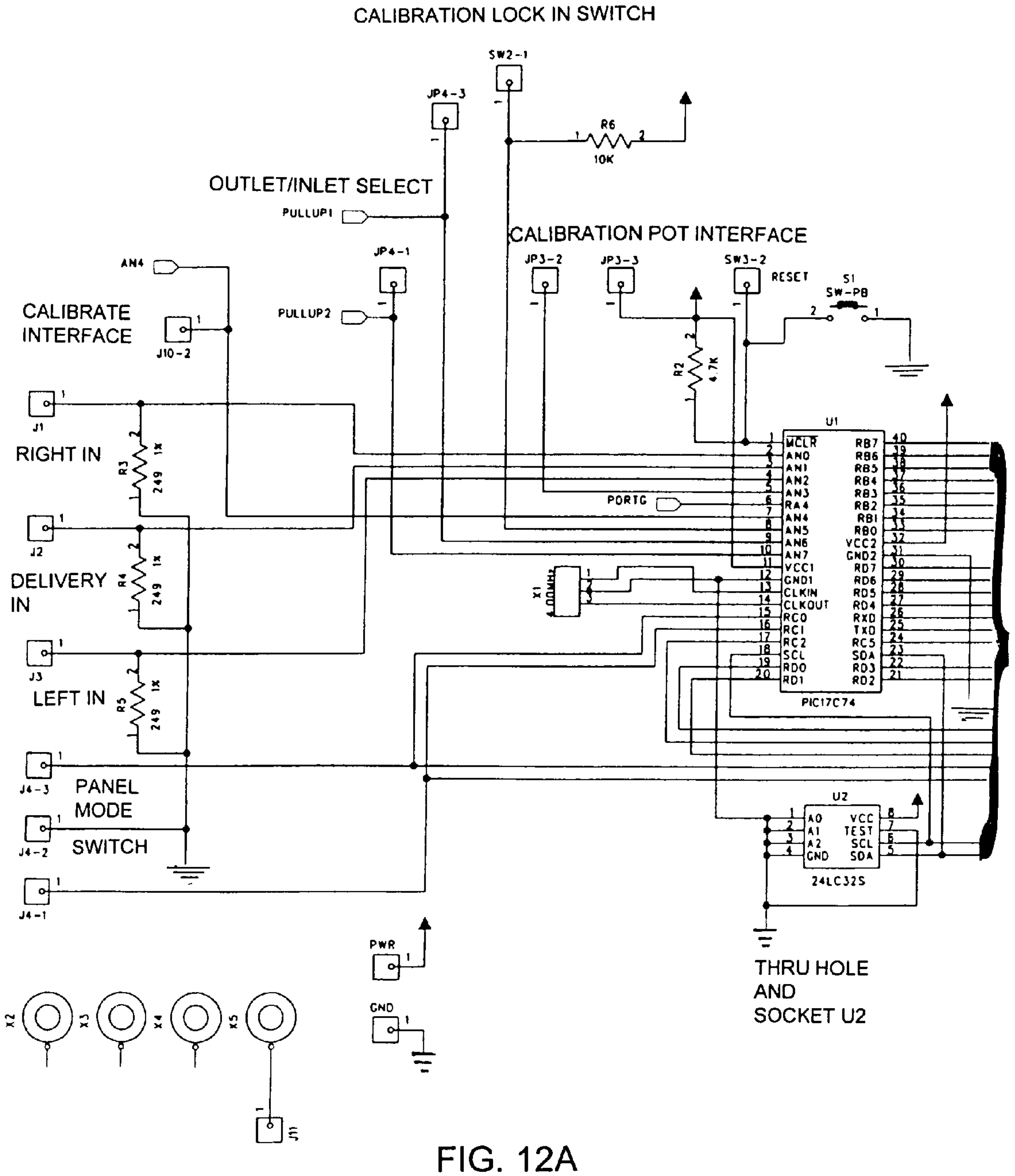
FIGS. 12A, 12B, 13A and 13B are electrical schematic diagrams.
Figure 12B:
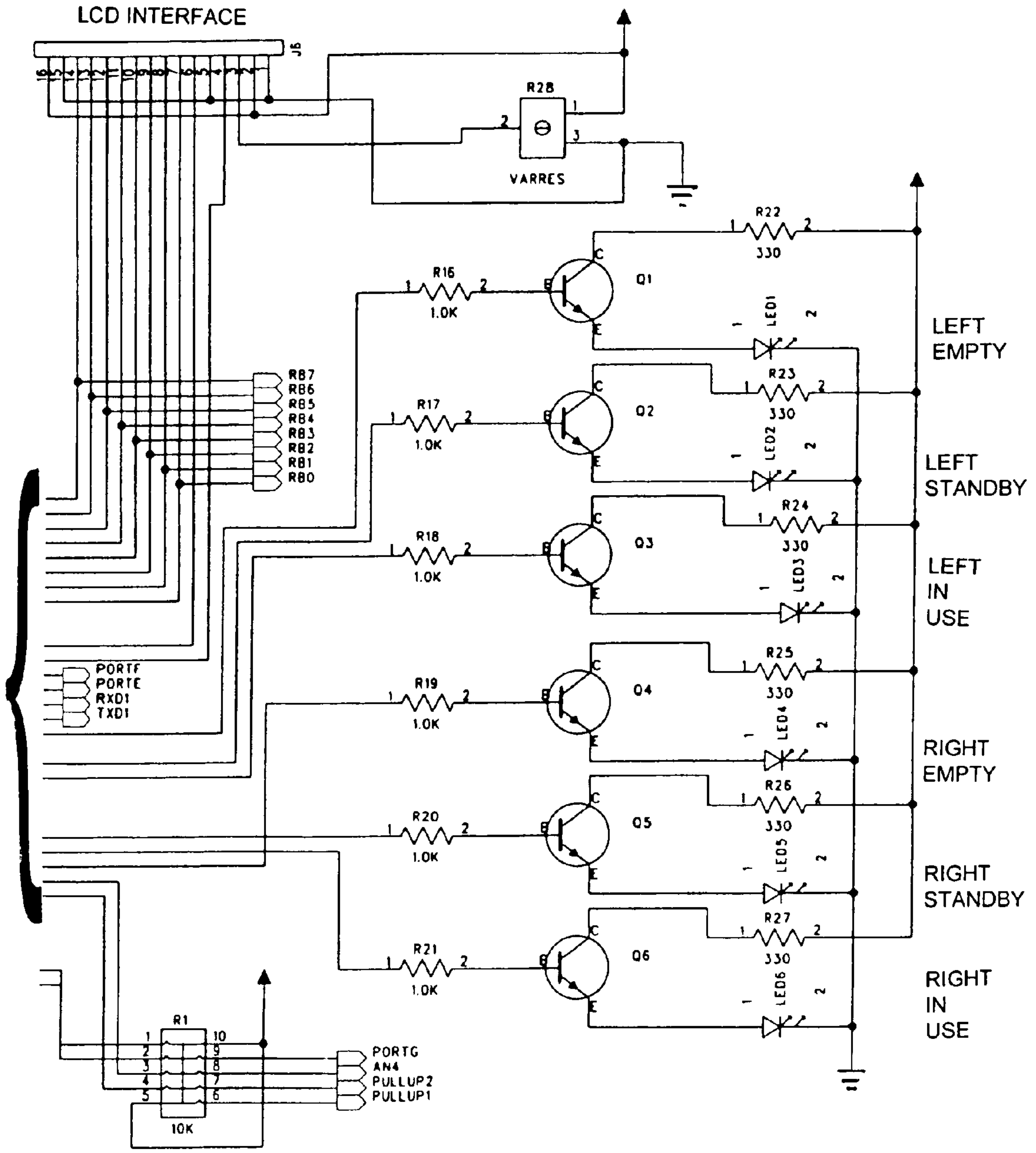
Figure 13A:
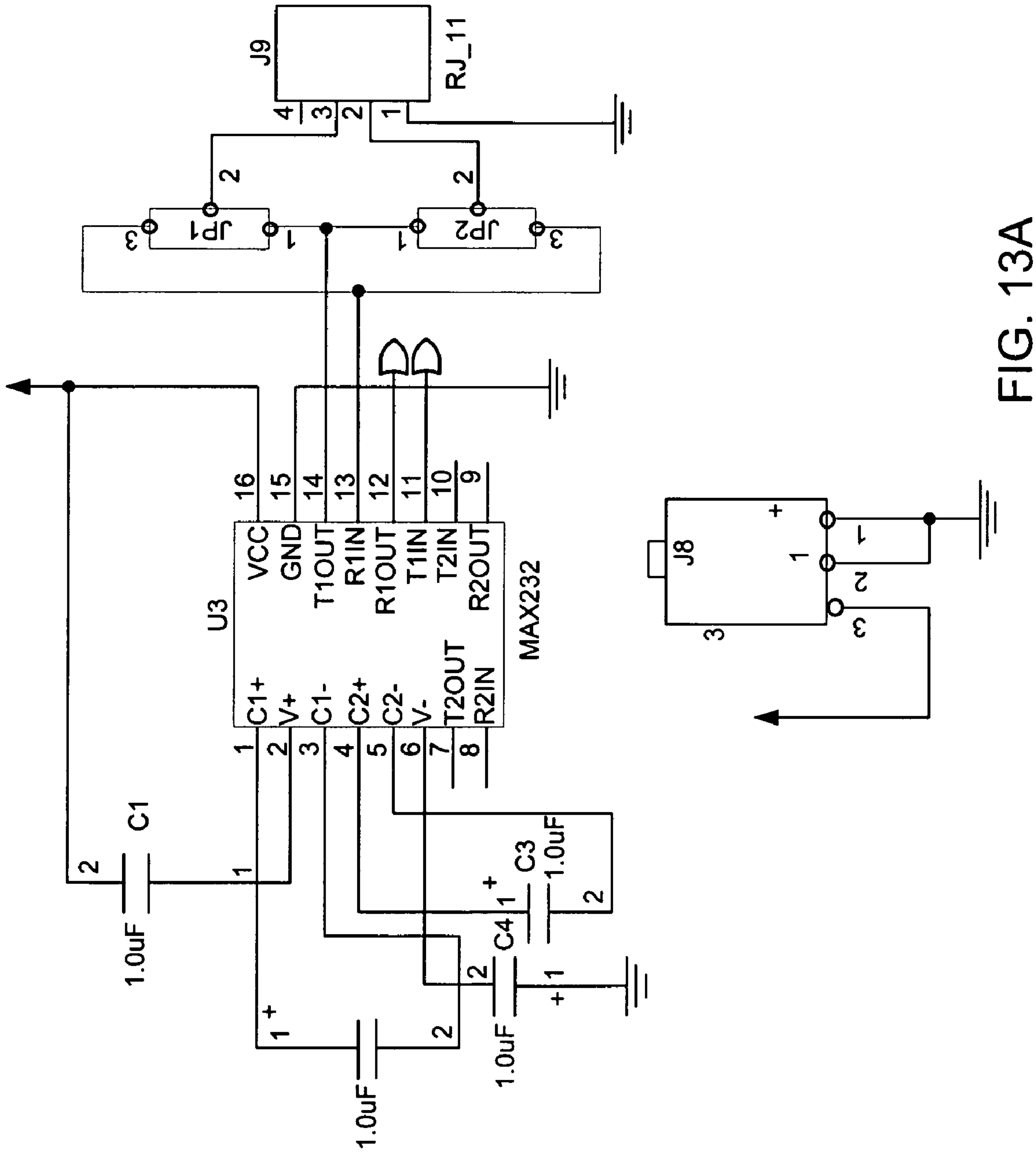
Figure 13B:
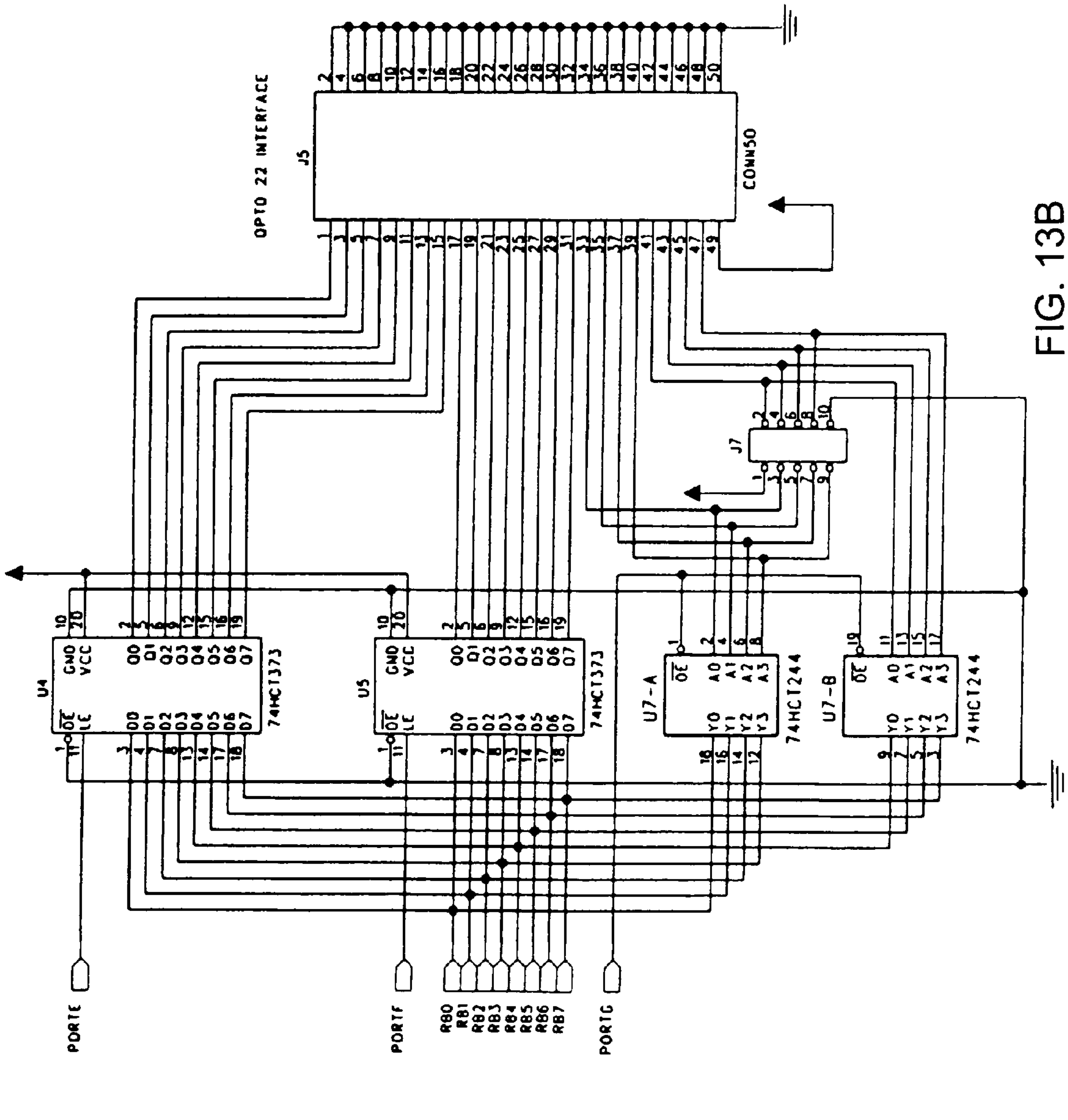

FIG. 11 depicts one such relationship between the voltage signal input and the pressure.

Returning to FIG. 11E at decision-making point 236, a determination is made as to whether the push button switch is activated. If it is, the setting displayed on the LCD may be programmed into memory at step 238. Similar processes are repeated for the right switchover set point calibration process and the delivery set point calibration process.

FIGS. 12A, 12B, 13A and 13B provide electrical schematics of the present invention. These schematics and their equivalents are easily understood by those skilled in the art.

Figure 14:
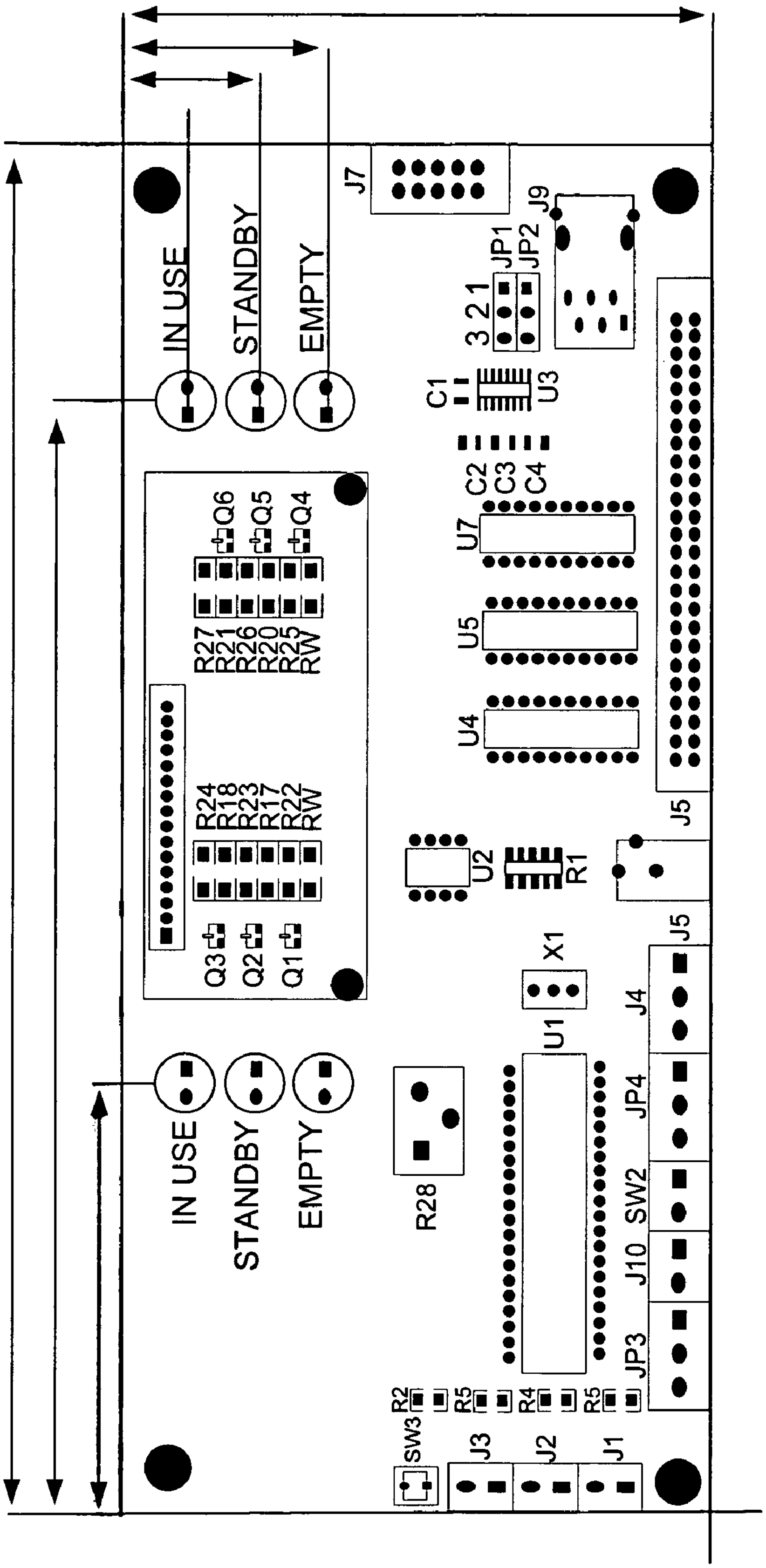
FIG. 14 is a component placement mechanical drawing of the front panel circuit board.

FIG. 14 provides a physical layout of the circuit components within a circuit board. It should be understood that this layout is just one potential layout of the present invention.

In summary, the present invention provides a gas manifold that provides an uninterrupted supply of gas and switches between at least two gas sources. This gas manifold couples to a first gas source and at least one additional gas source. The pressure transducer at the inlet reads the pressure associated with the individual gas source. A downstream pressure regulator of each pressure transducer regulates the pressure of gas supplied to a three-way valve or multiple-way valve, which is operated by a control system that directs which gas source will be used to provide gas to the outlet line. This control system will monitor the pressure as read by the pressure transducer at the gas inlets to determine which gas source will be placed on service depending on user preferences. This control system will then direct the operation of the three-way valve to effect those choices. The present invention provides a significant technical advantage by providing uninterrupted gas supplies to a gas-consuming system. Furthermore, the present invention provides a system of determining when a gas source must be replenished or is experiencing a fault condition.

Although the present invention is described in detail, it should be understood that various changes, substitutions and alterations can be made hereto without departing from the spirit and scope of the invention as described by the appended claims.

What is claimed is:

1. A gas manifold that provides an uninterrupted supply of gas, comprising:

a first gas supply that serves as an online gas supply;

a first gas inlet operable to receive said first gas supply having:

a first pressure transducer that senses the pressure of the gas at the first gas inlet; and a first regulator operable to regulate the pressure of the gas supplied by the first gas supply;

a second gas supply that serves as a reserve gas supply;

a second gas inlet operable to receive said second gas supply having:

a second pressure transducer that senses the pressure of the gas at the second gas inlet; and a second regulator operable to regulate the pressure of the gas supplied by the second gas supply;

a control valve connected to the first and second gas inlets and to a gas outlet; and a microcontroller based control circuit that provides a control signal to said control valve based on signals from said first and second pressure transducers, wherein said circuit directs that said reserve gas supply be placed online when said pressure monitored by said first pressure transducer falls below an electronically established preset level.

2. The gas manifold of claim 1, further comprising:

an alarm relay connected to said control circuit, wherein said alarm relay activates an alarm upon the pressure from said first and second pressure transducer falling below a preset level.

3. The gas manifold of claim 1, further comprising:

a third pressure transducer, sensing the pressure of the gas at the gas outlet, and connected to the control circuit; and a display connected to the control circuit displaying the pressure sensed by the third pressure transducer.

4. The gas manifold of claim 1, wherein said preset level may be programmed by a user.

5. The gas manifold of claim 1, further comprising a first and second pressure regulator downstream of said first and second pressure transducer respectively.

6. The gas manifold of claim 5, further comprising a third pressure regulator downstream of said control valve.

7. The gas manifold of claim 1, wherein said first and second gas supply comprises a low pressure liquid source.

8. The gas manifold of claim 1, wherein said first and second gas supply comprises a high pressure gas source.

9. The gas manifold of claim 1, wherein said first gas supply comprises a low pressure liquid source and said second gas supply comprises a high pressure gas source.

10. The gas manifold of claim 1, wherein said second gas supply comprises a low pressure liquid source and said first gas supply comprises a high pressure gas source.

11. The gas manifold of claim 1, wherein said online gas supply becomes said reserve gas supply when said reserve gas supply has been replenished.

12. The gas manifold of claim 1, wherein an alarm activates when said reserve gas supply pressure drops below a predetermined level.

13. A gas manifold that provides an uninterrupted supply of gas, comprising:

a first gas supply that serves as an online gas supply;

a first gas inlet operable to receive said first gas supply having a first pressure transducer that senses the pressure of the gas at the first gas inlet;

a first pressure regulator downstream of said first pressure transducer;

a second gas supply that serves as a reserve gas supply;

a second gas inlet operable to receive said second gas supply having a second pressure transducer that senses the pressure of the gas at the second gas inlet;

a second pressure regulator downstream of said second pressure transducer;

a control valve connected to the first and second gas inlets and to a gas outlet;

a third pressure regulator downstream of said control valve; and a microcontroller based control circuit that provides a control signal to said control valve based on signals from said first and second pressure transducers, wherein said circuit directs that said reserve gas supply be placed online when said pressure monitored by said first pressure transducer falls below an electronically established preset level.

14. The gas manifold of claim 13, further comprising:

an alarm relay connected to said control circuit, wherein said alarm relay activates an alarm upon the pressure from said first and/or second pressure transducer falling below a preset level.

15. The gas manifold of claim 13, further comprising:

a third pressure transducer, sensing the pressure of the gas at the gas outlet, and connected to the control circuit; and a display connected to the control circuit displaying the pressure sensed by the third pressure transducer.

16. The gas manifold of claim 13, wherein said preset levels may be programmed by a user.

17. The gas manifold of claim 13, wherein said first and second gas supply comprises a low pressure liquid source or a high pressure gas source.

18. The gas manifold of claim 13, wherein said online gas supply becomes said reserve gas supply when said reserve gas supply has been replenished.

19. The gas manifold of claim 1, wherein an alarm activates when said reserve gas supply pressure drops below a predetermined level.

20. A gas manifold that provides an uninterrupted supply of gas, comprising:

a first gas supply that serves as an online gas supply, wherein said first gas supply comprises a low pressure liquid source or a high pressure gas source;

a first gas inlet operable to receive said first gas supply having a first pressure transducer that senses the pressure of the gas at the first gas inlet;

a first pressure regulator downstream of said first pressure transducer;

a second gas supply that serves as a reserve gas supply, wherein said second gas supply comprises a low pressure liquid source or a high pressure gas source;

a second gas inlet operable to receive said second gas supply having a second pressure transducer that senses the pressure of the gas at the second gas inlet;

a second pressure regulator downstream of said second pressure transducer, a control valve connected to the first and second gas inlets and to a gas outlet;

a third pressure regulator downstream of said control valve;

a third pressure transducer sensing the pressure of the gas at the gas outlet;

a control circuit that provides a control signal to said control valve based on signals from said first, second, and third pressure transducers, wherein said circuit directs that said reserve gas supply be placed online when said pressure monitored by said first pressure transducer falls below a preset level;

a display connected to the control circuit displaying the pressure selected by a user; and an alarm relay connected to said control circuit, wherein said alarm relay activates an alarm upon the pressure from said first and/or second pressure transducer falling below a preset level, wherein said preset levels may be programmed by said user.

* * * * *